(12) United States Patent  (10) Patent No.: US 8,308,564 B2
Yoshida et al.  (45) Date of Patent: Nov. 13, 2012

(54) STORAGE MEDIUM HAVING GAME PROGRAM STORED THEREON AND GAME APPARATUS

(75) Inventors: Misuzu Yoshida, Kyoto (JP); Masayuki Taira, Kyoto (JP); Yuuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1054 days.

(21) Appl. No.: 11/526,731

(22) Filed: Sep. 26, 2006

(65) Prior Publication Data

US 2007/0270218 A1   Nov. 22, 2007

(30) Foreign Application Priority Data

May 8, 2006 (JP) ................................. 2006-129369

(51) Int. Cl.
*A63F 13/00* (2006.01)
(52) U.S. Cl. .................. 463/37; 463/36; 463/49; 463/50
(58) Field of Classification Search ...................... 463/35, 463/36, 37, 43, 49, 50
See application file for complete search history.

(56) References Cited

U.S. PATENT DOCUMENTS

| 4,839,838 | A | 6/1989 | LaBiche et al. | |
|---|---|---|---|---|
| 6,369,952 | B1 * | 4/2002 | Rallison et al. | 359/630 |
| 2002/0065121 | A1 * | 5/2002 | Fukunaga et al. | 463/8 |
| 2002/0075225 | A1 * | 6/2002 | Schena et al. | 345/156 |
| 2002/0098892 | A1 | 7/2002 | Koike | |
| 2003/0057808 | A1 | 3/2003 | Lee et al. | |
| 2003/0222851 | A1 | 12/2003 | Lai et al. | |
| 2004/0147317 | A1 | 7/2004 | Ito et al. | |
| 2004/0219981 | A1 * | 11/2004 | Bando | 463/35 |
| 2004/0252109 | A1 | 12/2004 | Trent et al. | |
| 2005/0070359 | A1 | 3/2005 | Rodriquez et al. | |
| 2005/0119036 | A1 * | 6/2005 | Albanna et al. | 463/7 |
| 2005/0134555 | A1 | 6/2005 | Liao | |
| 2005/0159223 | A1 * | 7/2005 | Tahara et al. | 463/43 |
| 2006/0094502 | A1 | 5/2006 | Katayama et al. | |
| 2006/0123146 | A1 | 6/2006 | Wu et al. | |
| 2006/0231794 | A1 | 10/2006 | Sakaguchi et al. | |
| 2006/0252477 | A1 | 11/2006 | Zalewski et al. | |
| 2007/0015588 | A1 | 1/2007 | Matsumoto et al. | |
| 2007/0265084 | A1 * | 11/2007 | Sato et al. | 463/37 |
| 2007/0265085 | A1 * | 11/2007 | Miyamoto et al. | 463/37 |

FOREIGN PATENT DOCUMENTS

| JP | 8-71252 | 3/1994 |
|---|---|---|
| JP | 6-190144 A | 7/1994 |
| JP | 2001-104643 | 4/2001 |
| JP | 2001-306245 A | 11/2001 |
| JP | 2002-153673 | 5/2002 |
| JP | 2002-200343 A | 7/2002 |
| JP | 2002-306846 A | 10/2002 |
| JP | 2005-21458 A | 1/2005 |

* cited by examiner

*Primary Examiner* — Dmitry Suhol
*Assistant Examiner* — Brandon Gray
(74) *Attorney, Agent, or Firm* — Nixon & Vanderhye P.C.

(57) ABSTRACT

Game data variable in accordance with the state of an input device and usable for game processing is sequentially obtained. Next, it is determined whether or not a predetermined condition for the game processing has been fulfilled based on the game data. Information on an indicated position on a game image, which is calculated from the game data when the predetermined condition has been fulfilled, is obtained. A moving speed of the input device which is calculated from the game data is also obtained. When the obtained moving speed is equal to or greater than a predetermined speed, an object which appears in a virtual game space and is related to the indicated position is processed.

16 Claims, 23 Drawing Sheets

LOCAL COORDINATE SYSTEM

LOCAL COORDINATE SYSTEM

SPATIAL COORDINATE SYSTEM

SPATIAL COORDINATE SYSTEM    SPATIAL COORDINATE SYSTEM

STORAGE MEDIUM HAVING GAME PROGRAM STORED THEREON AND GAME APPARATUS

CROSS REFERENCE TO RELATED APPLICATION

The disclosure of Japanese Patent Application No. 2006-129369 filed on May 8, 2006 is incorporated herein by reference.

BACKGROUND

1. Field of the Technology

The technology presented herein relates to a storage medium having a game program stored thereon and a game apparatus, and more specifically to a game apparatus for executing game processing based on a state of an input device, which is at least one of a position and a moving speed of the input device, and a storage medium having a game program for such game processing stored thereon.

2. Description of the Background Art

Conventionally, games playable using an optical pointing device have been proposed. Such games include, for example, a shooting game of shooting a target displayed on a screen using an input device mimicking a gun (hereinafter, referred to as a "gun-type controller"). A gun-type controller used for such a game includes a CCD camera. A light emitting element is provided in the vicinity of the screen as an imaging target, so that the CCD camera takes an image encompassing the light emitting element. Based on the obtained image data, the position of the light emitting element in the taken image is obtained. Based on the position of the light emitting element, the position on the screen pointed to by the gun-type controller is calculated (for example, Japanese Laid-Open Patent Publication No. 8-71252).

A game apparatus using a gun-type controller including a light receiving sensor and an inclination sensor is also disclosed (for example, Japanese Laid-Open Patent Publication No. 2001-104643). With this game apparatus, an amount of light used for raster-scanning the screen is detected by the light receiving sensor, and the position on the screen which is hit by the bullet is detected based on the amount of light. The inclination sensor is structured so as to become conductive when the gun-type controller is inclined at a predetermined angle, utilizing the conductance effect of mercury. Based on whether the inclination sensor is conductive or not, an offense state or a defense state is selectively input.

A game apparatus using an input device including an acceleration sensor is also disclosed (for example, Japanese Laid-Open Patent Publication No. 2002-153673). With this game apparatus, a boxing game is playable. A glove-shaped input device having a built-in three-axial acceleration sensor is put on a hand of a player. When the player performs an operation of making a punch, the acceleration sensor determines the type of the punch (straight, hook, upper, etc.) made by the player.

However, the conventional game apparatuses disclosed in the above-identified publications have the following problems. With the game apparatus described in Japanese Laid-Open Patent Publication No. 8-71252, the gun-type controller is used only to specify a position on the screen. Therefore, the player using the gun-type controller can only perform one type of operation of indicating a position on the screen. Such a game operation is too plain to make the game amusing to play.

With the game apparatus described in Japanese Laid-Open Patent Publication No. 2001-104643, the player can perform an operation only based on whether the inclination sensor is conductive or not, i.e., only an operation of selecting one of two alternatives. Such a game operation, although being slightly more complicated than that provided by Japanese Laid-Open Patent Publication No. 8-71252, is still too plain to make the game amusing to play.

The game apparatus described in Japanese Laid-Open Patent Publication No. 2002-153673 merely determines the type of the punch, i.e., the motion of the player's hand, by the acceleration sensor and reflects the motion on the game image. The game apparatus does not allow the player to specify a position on the screen and reflect the motion of his/her hand detected by the acceleration sensor on an object existing at the specified position.

In addition, the game apparatus described in Japanese Laid-Open Patent Publication No. 2002-153673 does not detect a posture of the input device. Whether the player may make a straight punch forward or upward, the punch is determined merely as a "straight punch". Even if the player makes a straight punch upward, a straight punch is displayed as being made forward on the screen. Namely, the motion, intended by the player, of making a straight punch upward is not reflected. This may result in a game with very poor operability.

SUMMARY

Therefore, a feature of an example embodiment presented herein is to provide a storage medium having stored thereon a game program for allowing a player both to perform an operation of specifying a position on a screen and an operation of instructing how an object is to be processed, intuitively and easily, and a game apparatus for executing such a game program.

Another feature of the present embodiment is to provide a storage medium having stored thereon a game program for allowing a player to reflect an intended motion on a game image by moving an input device regardless of the posture of the input device, and a game apparatus for executing such a game program.

The present embodiment has the following features to attain the above. The reference numerals, step numbers and the like in parentheses in this section of the specification indicate the correspondence with the embodiments described later for easier understanding of the present embodiment, and do not limit the present embodiment in any way.

A first aspect of the present embodiment is directed to a storage medium having stored thereon a game program executable by a computer of a game apparatus (3) for executing game processing based on a state of an input device (7), which is at least one of a position and a moving speed of the input device. The game program causes the computer to execute a game data obtaining step (S4, S6, S63, S73), a determination step (S11, S76), an indicated position establishment step (S13, S41), a speed establishment step (S28, S77), and a processing step (S15, S36). The game data obtaining step sequentially obtains game data variable in accordance with the state of the input device and usable for the game processing. The determination step determines whether or not a predetermined condition for the game processing has been fulfilled based on the game data. The indicated position establishment step obtains information on an indicated position on a game image, which is calculated from the game data when the predetermined condition has been fulfilled. The speed establishment step obtains the moving speed of the input device which is calculated from the game data after the information on the indicated position is obtained. The processing step, when the moving speed obtained in the speed establishment step is equal to or greater than a predetermined speed, processes an object which appears in a virtual game space and is related to the indicated position.

In a second aspect, the input device includes imaging means (74) for taking an image of a predetermined imaging target. The game program causes the computer to further execute a coordinate set calculation step (S4) of calculating a coordinate set of a position of the imaging target in an image taken by the imaging means. The game data obtaining step obtains, as the game data, data representing the coordinate set, or data corresponding the position of the input device which is calculated from the data representing the coordinate set.

In a third aspect, the input device includes an acceleration sensor (701). The game data obtaining step obtains, as the game data, data representing an output from the acceleration sensor, or data corresponding to the moving speed of the input device which is calculated from the data representing the output from the acceleration sensor.

In a fourth aspect, the processing step includes a moving parameter determination step (S14) of determining a moving start position and a moving direction of the object in the virtual game space based on the indicated position and the moving speed; and a moving starting step (S15) of starting processing for moving the object based on the moving start position and the moving direction.

In a fifth aspect, the processing step includes a target object selection step (S38, S41) of, when the object is present within a predetermined distance from the indicated position obtained in the indicated position establishment step, selecting the object as a target of motion control. The processing step controls a motion of only the object selected in the target object selection step.

In a sixth aspect, the target object selection step includes a stay time determination step (S40) of determining whether or not a state in which the indicated position and the object are present within the predetermined distance continued for a predetermined time duration or longer. When the state in which the indicated position and the object are present within the predetermined distance continued for the predetermined time duration or longer, the target object selection step selects the object present within the predetermined distance as a motion control target.

In a seventh aspect, the game program causes the computer to further execute a moving pattern calculation step of, when the stay time determination step determines that the state in which the indicated position and the object are present within the predetermined distance continued for the predetermined time duration or longer, calculating, from the game data, information on a change in the moving direction or the moving speed of the input device during the time duration. When the change in the moving direction or the moving speed shows a predetermined pattern, the target object selection step selects the object present within the predetermined distance as a motion control target.

In an eighth aspect, the processing step causes the object to start performing a first motion (S36) when the moving speed obtained in the speed establishment step is within a first range, and causes the object to start performing a second motion (S44), which is different from the first motion, when the moving speed obtained in the speed establishment step is within a second range which is different from the first range.

A ninth aspect is directed to a game apparatus (3) for executing game processing based on a state of an input device (7), which is at least one of a position and a moving speed of the input device. The game apparatus comprises a game data obtaining section (30), a determination section (30), an indicated position establishment section (30), a speed establishment section (30), and a processing section (30). The game data obtaining section sequentially obtains game data variable in accordance with the state of the input device and usable for the game processing. The determination section determines whether or not a predetermined condition for the game processing has been fulfilled based on the game data. The indicated position establishment section obtains information on an indicated position on a game image, which is calculated from the game data when the predetermined condition has been fulfilled. The speed establishment section obtains the moving speed of the input device which is calculated from the game data after the information on the indicated position is obtained. The processing section, when the moving speed obtained by the speed establishment section is equal to or greater than a predetermined speed, processes an object which appears in a virtual game space and is related to the indicated position.

A tenth aspect is directed to a storage medium having stored thereon a game program executable by a computer of a game apparatus for executing game processing based on a motion of an input device including an acceleration sensor. The game program causes the computer to execute an acceleration data obtaining step (S84), a storage step, a ratio determination step (S85, S88), a conversion parameter calculation step (S89), and a control step (S76 through S79). The acceleration data obtaining step obtains data representing an output from the acceleration sensor, or data corresponding to an acceleration of the input device which is calculated from the data representing the output from the acceleration sensor, at an interval of a unit time. The storage step stores the acceleration data obtained in the acceleration data obtaining step. The ratio determination step detects, from the data stored in the storage step, a ratio of accelerations having a value close to a value of a gravitational acceleration with respect to accelerations for a predetermined time duration counted backward from the time when the data was obtained in the acceleration data obtaining step. The conversion parameter calculation step, when the ratio is equal to or greater than a predetermined value, calculates a conversion parameter for allowing a direction of each of the accelerations, having a value close to the value of the gravitational acceleration in a coordinate system for the input device, to be detected as a direction of the gravitational acceleration. The control step executes the game processing based on the motion of the input device, which is obtained as a result of the conversion performed using the conversion parameter.

In an eleventh aspect, the game program causes the computer to further execute an average direction calculation step of obtaining an average of the directions of the accelerations having a value close to the value of the gravitational acceleration. The conversion parameter calculation step calculates a conversion parameter for allowing the average of the directions obtained in the average direction calculation step to be detected as the direction of the gravitational acceleration.

A twelfth aspect is directed to a game apparatus for executing game processing based on a motion of an input device including an acceleration sensor. The game apparatus comprises an acceleration data obtaining section (30), a storage section (33), a ratio determination section (30), a conversion parameter calculation section (30), and a control section (30). The acceleration data obtaining section obtains data representing an output from the acceleration sensor, or data corresponding to an acceleration of the input device which is calculated from the data representing the output from the acceleration sensor, at an interval of a unit time. The storage section stores the acceleration data obtained by the acceleration data obtaining section. The ratio determination section detects, from the data stored by the storage section, a ratio of accelerations having a value close to a value of a gravitational acceleration with respect to accelerations for a predetermined time duration counted backward from the time when the data was obtained by the acceleration data obtaining section. The conversion parameter calculation section, when the ratio is equal to or greater than a predetermined value, calculates a conversion parameter for allowing a direction of each of the accelerations, having a value close to the value of the gravitational acceleration in a coordinate system for the input device, to be detected as a direction of the gravitational acceleration. The control section executes the game processing based on the motion of the input device, which is obtained as a result of the conversion performed using the conversion parameter.

According to the first aspect, the player is allowed to perform two types of operations of (i) specifying a position on a screen and (ii) instructing how an object is to be processed, merely by moving an input device held in his/her hand in a desired direction with no reliance on a lever or button. This allows the player to operate in a novel and intuitive manner, and provides a new type of game. By combining the two types of operations, the game is made complicated and more amusing to play.

According to the second aspect, the coordinate set of the position on the screen pointed to by the input device, and the inclination angle of the input device, can be calculated based on the coordinate set of the position of the imaging target in the image taken by the imaging means.

According to the third aspect, the motion of the input device can be determined using the acceleration data which is output from the acceleration sensor included in the input device.

According to the fourth aspect, the player is allowed to control the movement of the object in a novel and intuitive manner. This makes the game more amusing to play.

According to the fifth aspect, in the state where an object which is a selection target is displayed on the screen, the object can be selected merely by indicating a position relatively close to the object. It is not necessary to indicate an exact display position of the object. This improves the operability.

According to the sixth aspect, the player's intention to select an object can be checked by determining whether or not a position in the vicinity of the object is kept indicated for a predetermined time duration or longer. This prevents an erroneous operation of selecting an object against the player's intention, and thus improves the operability.

According to the seventh aspect, the player is allowed to select an object in an easy and intuitive operation. This prevents an erroneous operation of selecting an object against the player's intention.

According to the eighth aspect, the object is made to make different motions in accordance with the moving speed of the input device. This prevents the game from becoming too simple to be amusing.

According to the ninth aspect, substantially the same effect as that of the first aspect is provided.

According to the tenth through twelfth aspects, the player's operation of moving the input device can be considered based on a rectangular coordinate system in which the direction of gravitational force is constantly a downward direction, i.e., a spatial coordinate system of the real world, regardless of the posture of the input device. As a result, an unintended operation such that, for example, although the input device is swung upward, the object is moved rightward in the game space for the reason that the input device is inclined rightward, can be avoided. The game is playable in a natural manner, with the operability conforming to the senses of the humans.

These and other, features, aspects and advantages of the present embodiment will become more apparent from the following detailed description of the present embodiment when taken in conjunction with the accompanying drawings.

DESCRIPTION OF THE PREFERRED EMBODIMENTS

Figure 1:
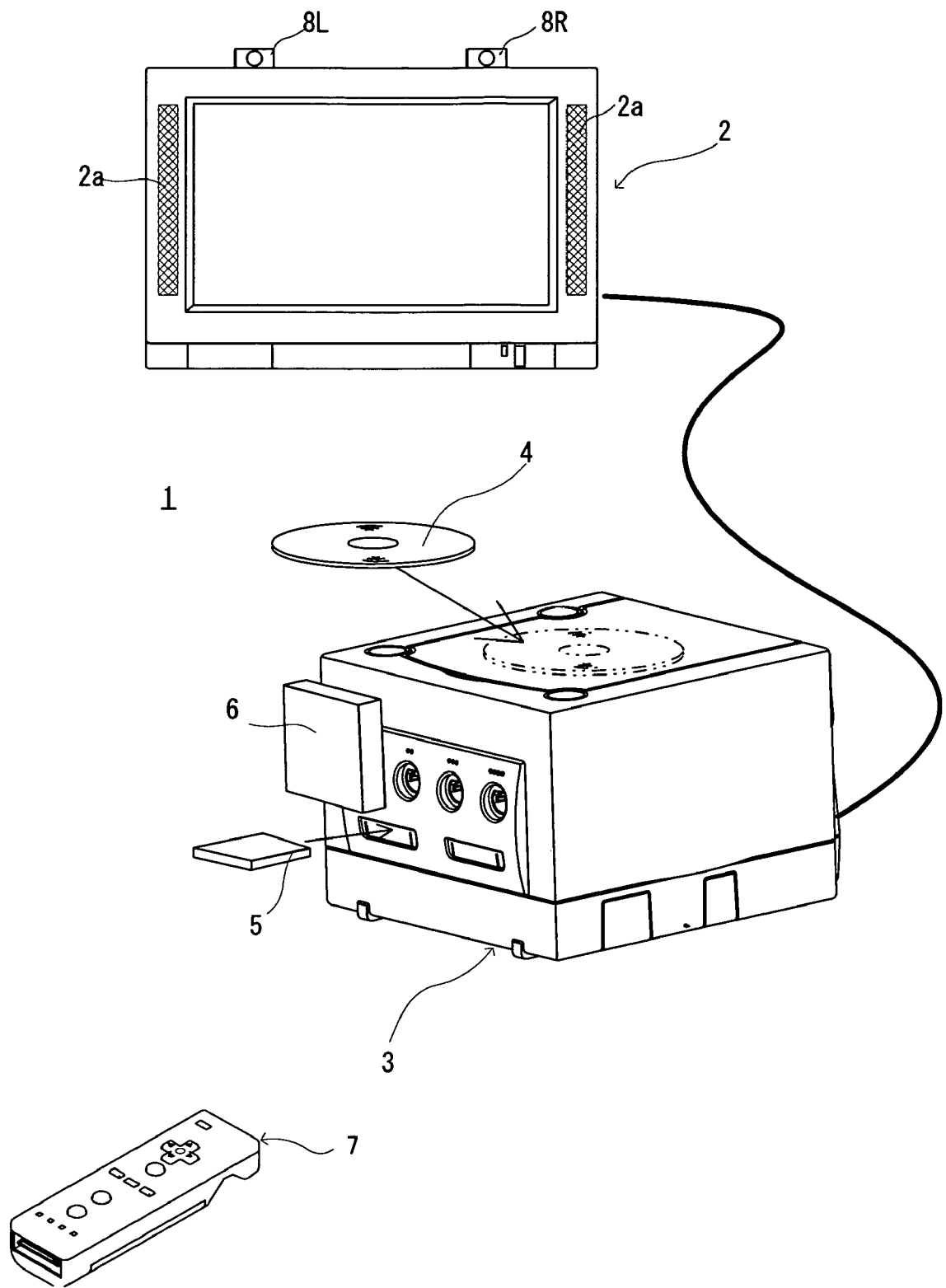
FIG. 1 is an external view of a game system 1 according to an embodiment.

Before providing a detailed description of each of the embodiments presented herein, a structure of a game apparatus commonly used in the embodiments will be described with reference to FIG. 1. Hereinafter, in order to give a specific description, a game system 1 using a game apparatus according to the present embodiment will be used as an example. FIG. 1 is an external view illustrating the game system 1. In the following description, the game apparatus is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker 2a via a connection cord, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 includes a power ON/OFF switch, a game processing reset switch, and an OPEN switch for opening a top lid of the game apparatus 3 on a top main surface of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. A player playing with the game apparatus 3 can enjoy the game by operating the controller 7 while watching the game image displayed on the monitor 2.

The controller 7 wirelessly transmits the transmission data from a communication section 75 included therein (described later) to the game apparatus 3 connected to the receiving unit 6, using the technology of, for example, Bluetooth (registered trademark). The controller 7 is operation means for mainly operating a player object appearing in a game space displayed on the monitor 2. The controller 7 includes an operation section having a plurality of operation buttons, a key, a stick and the like. As described later in detail, the controller 7 also includes an imaging information calculation section 74 for taking an image viewed from the controller 7. As an example of an imaging subject of the imaging information calculation section 74, two LED modules (hereinafter, referred to as "markers") 8L and 8R are provided in the vicinity of a display screen of the monitor 2. The markers 8L and 8R indicate a position of the controller 7. The markers 8L and 8R each output infrared light forward from the monitor 2.

Figure 2:
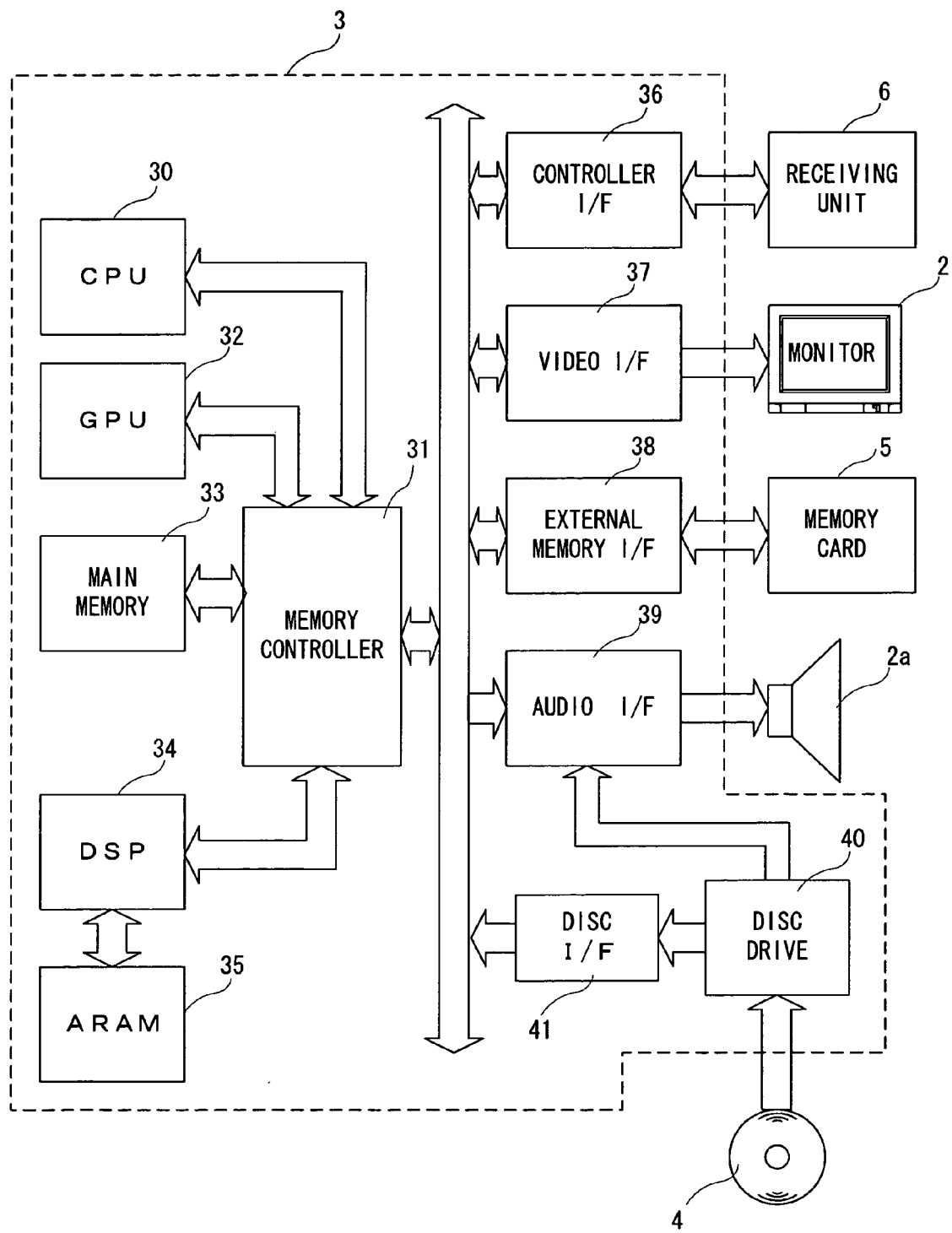
FIG. 2 is a functional block diagram of a game apparatus 3 shown in FIG. 1.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a start program stored in a boot ROM (not shown) to, for example, initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, and an ARAM (Audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to the receiving unit 6, the monitor 2, the external memory card 5, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data or the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (for example, storage of the game program or sound data already read). The DSP 34 reads the sound data stored in the ARAM 35 and outputs the sound data to the speaker 2a included in the monitor 2 via the memory controller 31 and the audio I/F 39.

The memory controller 31 comprehensively controls data transfer, and is connected to the various I/Fs described above. The controller I/F 36 includes, for example, four controller I/Fs 36a through 36d, and communicably connects the game apparatus 3 to an external device which is engageable via connectors of the controller I/Fs 36a through 36d. For example, the receiving unit 6 is engaged with such a connector and is connected to the game apparatus 3 via the controller I/F 36. As described above, the receiving unit 6 receives the transmission data from the controller 7 and outputs the transmission data to the CPU 30 via the controller I/F 36. The video I/F 37 is connected to the monitor 2. The external memory I/F 38 is connected to the external memory card 5 and is accessible to a backup memory or the like provided in the external card 5. The audio I/F 39 is connected to the speaker 2a built in the monitor 2, and is connected such that the sound data read by the DSP 34 from the ARAM 35 or sound data directly output from the disc drive 40 is output from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 3:
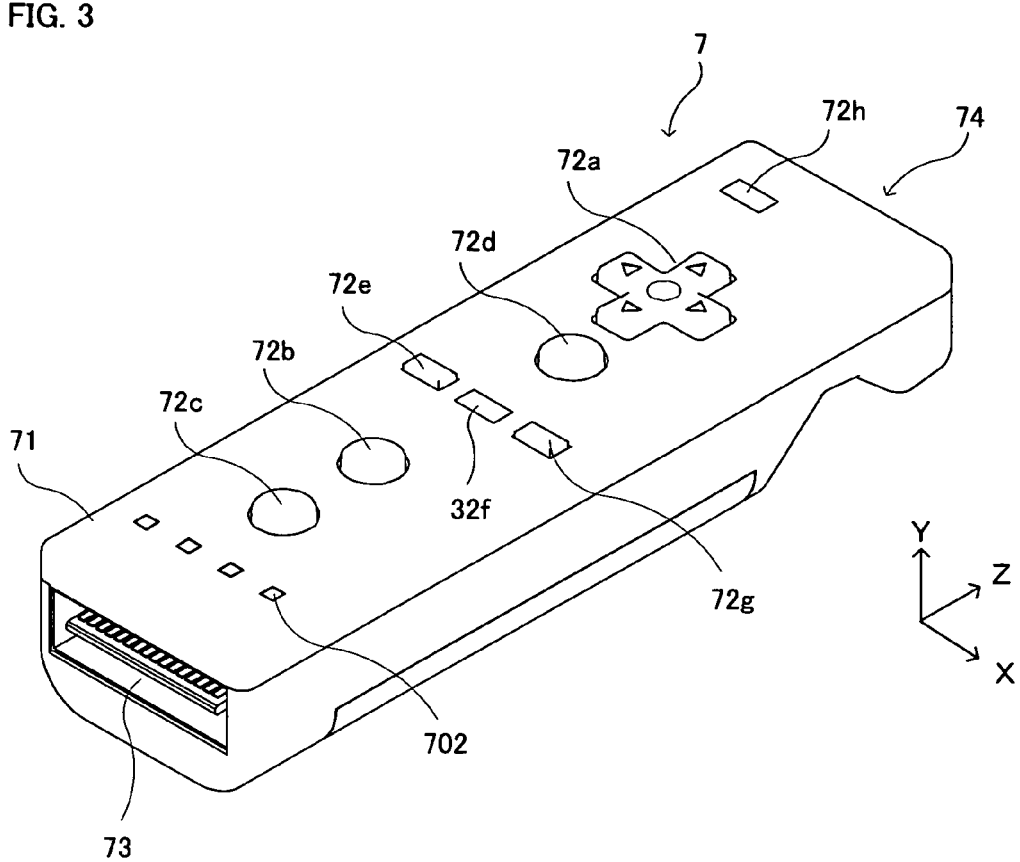
FIG. 3 is an isometric view of a controller 7 shown in FIG. 1 seen from the top rear side thereof.
Figure 4:
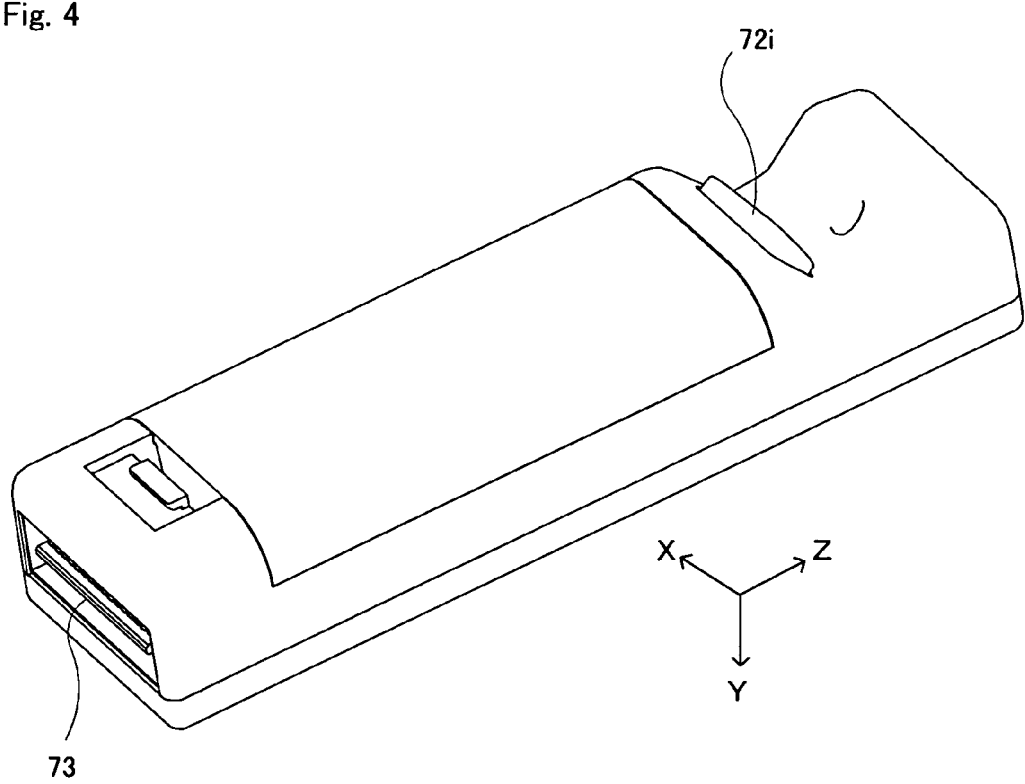
FIG. 4 is an isometric view of the controller 7 shown in FIG. 3 seen from the bottom rear side thereof.

With reference to FIG. 3 and FIG. 4, the controller 7 as an example of the input device according to the present embodiment will be described. FIG. 3 is an isometric view of the controller 7 seen from the top rear side thereof. FIG. 4 is an isometric view of the controller 7 seen from the bottom rear side thereof.

As shown in FIG. 3 and FIG. 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions represented by the arrows (front, rear, right and left), which are respectively located on cross-shaped projecting portions arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

The cross key 72a is an operation section for outputting an operation signal in accordance with the above-described direction input operation performed by the player, but such an operation section may be provided in another form. For example, the cross key 72a may be replaced with a composite switch including a push switch which includes a ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the cross key 72a may be replaced with an operation section which includes switches representing at least four directions (front, rear, right and left) and outputs an operation signal in accordance with the switch pressed by the player.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of an X button, a Y button and a B button. The operation buttons 72e through 72g are assigned functions of a select switch, a menu switch and a start switch, for example. The operation buttons 72b through 72g are assigned various functions in accordance with the game program executed by the game apparatus 3, but this will not be described in detail because the functions are not directly relevant to the present embodiment. In an exemplary arrangement shown in FIG. 3, the operation buttons 72b through 72d are arranged in a line at the center in the front-rear direction on the top surface of the housing 71. The operation buttons 72e through 72g are arranged in a line in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he/she is using. Specifically, when the controller 7 transmits the transmission data to the receiving unit 6, one of the plurality of LEDs corresponding to the controller type is lit up.

On a bottom surface of the housing 71, a recessed portion is formed. As described later, the recessed portion is formed at a position at which an index finger or middle finger of the player is located when the player holds the controller 7. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object.

On a front surface of the housing 71, an imaging element 743 (see FIG. 5B) included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. On a rear surface of the housing 71, a connector 73 is provided. The connector 73 is, for example, a 32-pin edge connector, and is used for engaging and connecting the controller 7 with a connection cable.

In order to give a specific description, a coordinate system which is set for the controller 7 will be defined. As shown in FIG. 3 and FIG. 4, X-, Y- and Z-axis directions perpendicular to one another are defined for the controller 7. Specifically, the longitudinal direction of the housing 71, i.e., the front-rear direction of the controller 7, is set as a Z-axis direction. A direction toward the front surface of the controller 7 (the surface having the imaging information calculation section 74) is set as a positive Z-axis direction. The up-to-down direction of the controller 7 is set as a Y-axis direction. A direction toward the top surface of the controller housing 71 (the surface having the cross key 72a and the like) is set as a positive Y-axis direction. The left-right direction of the controller 7 is set as an X-axis direction. A direction toward a left surface of the housing 71 (the surface which is not shown in FIG. 3 but is shown in FIG. 4) is set as a positive X-axis direction.

Figure 5A:
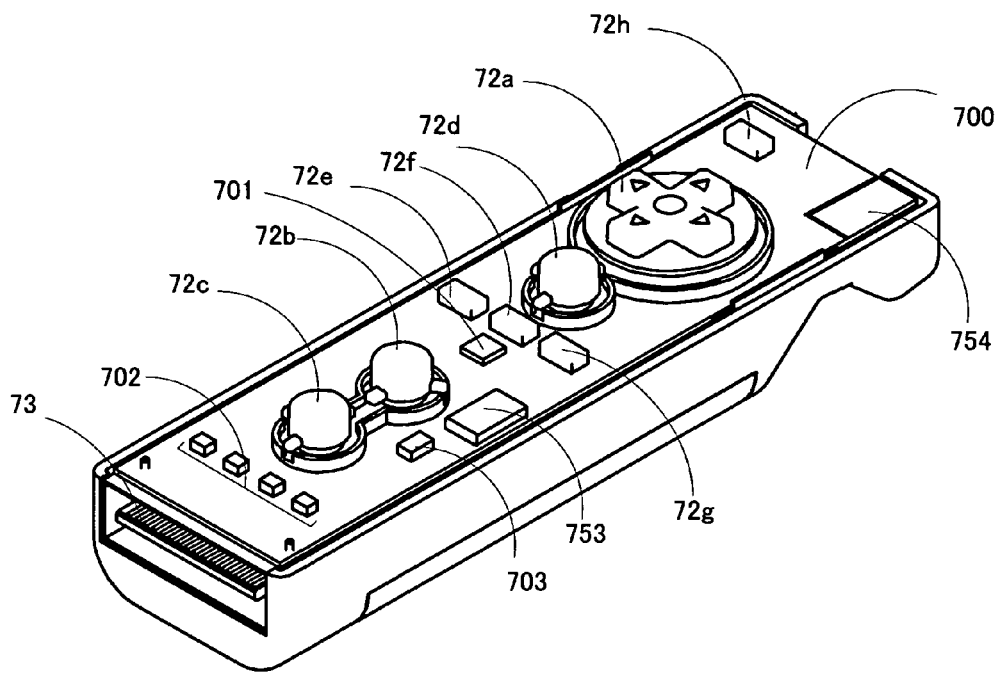
FIG. 5A is an isometric view of the controller 7 shown in FIG. 3 in the state where an upper casing is removed.
Figure 5B:
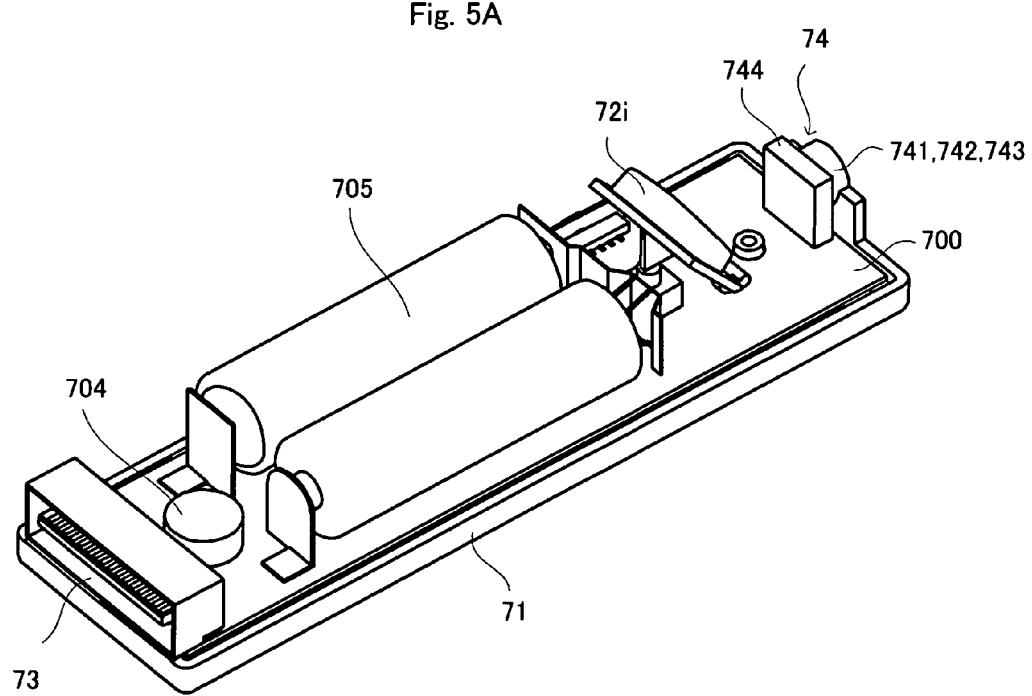
FIG. 5B is an isometric view of the controller 7 shown in FIG. 3 in the state where a lower casing is removed.

With reference to FIG. 5A and FIG. 5B, an internal structure of the controller 7 will be described. FIG. 5A is an isometric view illustrating a state where an upper casing (a part of the housing 71) of the controller 7 is removed. FIG. 5B is an isometric view illustrating a state where a lower casing (a part of the housing 71) of the controller 7 is removed. FIG. 5B shows a reverse side of a substrate 700 shown in FIG. 5A.

As shown in FIG. 5A, the substrate 700 is fixed inside the housing 71. On a top main surface of the substrate 700, the operation buttons 72a through 72h, an acceleration sensor 701, the LEDs 702, a quartz oscillator 703, a wireless module 753, an antenna 754 and the like are provided. These elements are connected to a microcomputer 751 (see FIG. 6) via lines (not shown) formed on the substrate 700 and the like. The acceleration sensor 701 detects and outputs the acceleration which is usable for calculating the inclination, vibration or the like in a three-dimensional space in which the controller 7 is present.

Figure 6:
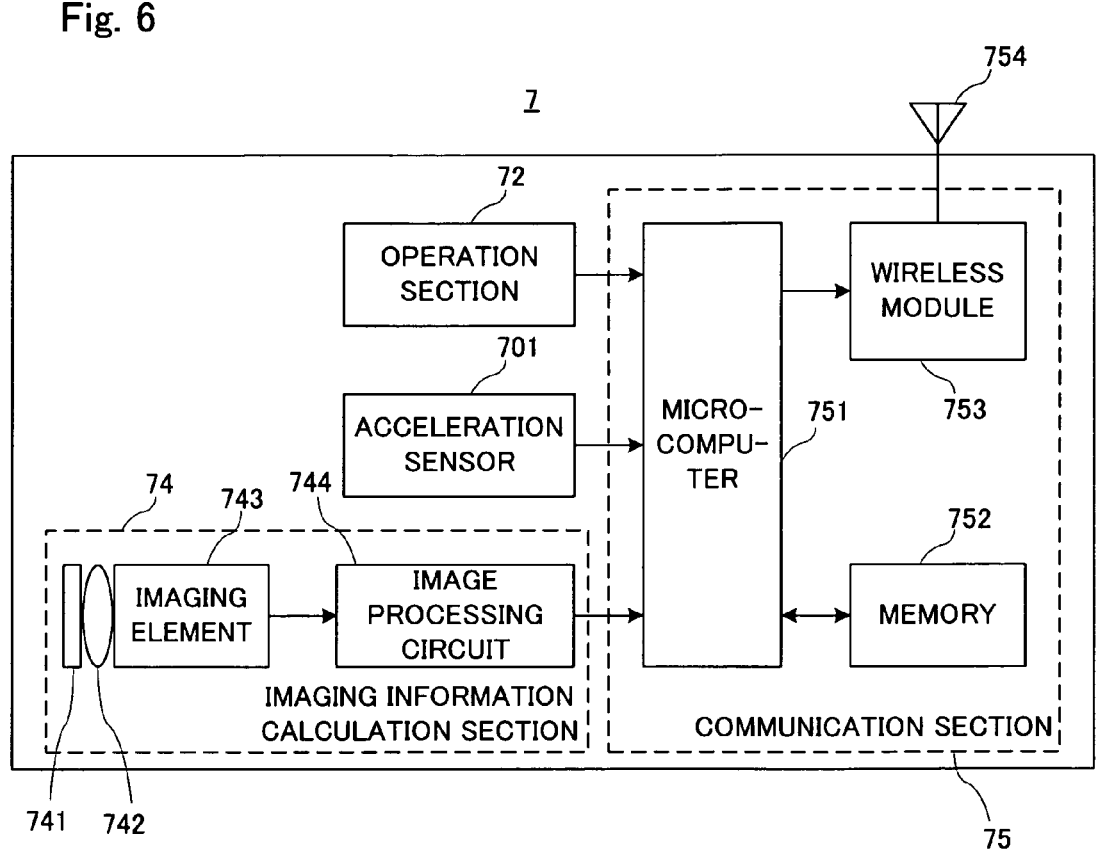
FIG. 6 is a block diagram illustrating a structure of the controller 7 shown in FIG. 3.

In more detail, the acceleration sensor 701 included in the controller 7 as shown in FIG. 6 is preferably a three-axial acceleration sensor. The three-axial acceleration sensor 701 detects a linear acceleration in three directions, i.e., an up-down direction (Y-axis direction shown in FIG. 3), a left-right direction (X-axis direction shown in FIG. 3), and a front-rear direction (Z-axis direction shown in FIG. 3). In another embodiment, two-axial acceleration detection means for detecting a linear acceleration in only X-axis and Y-axis directions (or directions along another pair of axes) may be used depending on the type of control signals used for game processing. For example, such a three-axial or two-axial acceleration sensor 701 may be available from Analog Devices, Inc. or STMicroelectroincs N.V. The acceleration sensor 701 is preferably of a static capacitance coupling system based on the technology of MEMS (Micro Electro Mechanical Systems) provided by silicon precision processing. Alternatively, the three-axial or two-axial acceleration sensor 701 may be based on an existing acceleration detection technology (for example, piezoelectric system or piezoelectric resistance system) or any other appropriate technology developed in the future.

As known to those skilled in the art, the acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of two or three axes thereof. Hence, the acceleration sensor 701 cannot directly detect a physical property such as, for example, a motion along a nonlinear path (for example, an arc path), rotation, revolution, angular displacement, inclination, position or posture.

Nonetheless, those skilled in the art would easily understand from the description of this specification that further information on the controller 7 can be estimated or calculated (determined) by executing additional processing on an acceleration signal which is output from the acceleration sensor 701. For example, when a static acceleration (gravitational acceleration) is detected, an inclination of the object (controller 7) with respect to the gravitational vector can be determined by performing calculations based on the inclination angle and the detected acceleration using the output from the acceleration sensor 701. By combining the acceleration sensor 701 with the microcomputer 751 (or another processor) in this manner, the inclination, posture or position of the controller 7 can be determined. Similarly, when the controller 7 including the acceleration sensor 701 is dynamically accelerated by a hand of the user as described later, various motions and/or position of the controller 7 can be calculated by processing an acceleration signal generated by the acceleration sensor 701. In another embodiment, the acceleration sensor 701 may include a built-in signal processing device, or another type of dedicated processing device, for executing desired processing on an acceleration signal which is output from the built-in acceleration detection means before the signal is output to the microcomputer 751. For example, when the acceleration sensor 701 is for detecting a static acceleration (for example, a gravitational acceleration), the built-in or dedicated processing device may convert the detected acceleration signal to a corresponding inclination angle (or another preferable parameter).

The communication section 75 including the wireless module 753 and the antenna 754 allows the controller 7 to act as a wireless controller. The quartz oscillator 703 generates a reference clock of the microcomputer 751 described later.

As shown in FIG. 5B, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. The operation button 72i is attached on the bottom main surface of the substrate 700 rearward to the image information calculation section 74, and cells 705 are accommodated rearward to the operation button 72i. On the bottom main surface of the substrate 700 between the cells 705 and the connector 73, a vibrator 704 is attached. The vibrator 704 may be, for example, a vibration motor or a solenoid. The controller 7 is vibrated by an actuation of the vibrator 704, and the vibration is conveyed to the player holding the controller 7. Thus, a so-called vibration-responsive game is realized.

With reference to FIG. 6, the internal structure of the controller 7 will be described. FIG. 6 is a block diagram showing the structure of the controller 7.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The markers 8L and 8R provided in the vicinity of the display screen of the monitor 2 are LEDs for outputting infrared light forward from the monitor 2. Therefore, the provision of the infrared filter 741 allows an image of the markers 8L and 8R to be taken more accurately. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 and generates image data. The image data generated by the imaging element 743 is processed by the image processing circuit 744. Specifically, the image processing circuit 744 processes the image data obtained from the imaging element 743 (images of the markers 8L and 8R), detects an area thereof having a high brightness, and outputs processing result data representing the coordinate set of the detected position and the size of the area to the communication section 75. The imaging information calculation section 74 is fixed to the housing 71 of the controller 7. The imaging direction of the imaging information calculation section 74 can be changed by changing the direction of the housing 71. Based on the processing result data which is output from the imaging information calculation section 74, a signal in accordance with the position or motion of the controller 7 is obtained. Based on the signal, an input coordinate set based on the coordinate system of the screen of the monitor 2 is obtained. Namely, the controller 7 acts as a pointing device because of the processing result data which is output from the imaging information calculation section 74.

As described above, the acceleration sensor 701 detects and outputs an acceleration in the form of components of three axial directions of the controller 7, i.e., the components of the up-down direction (Y-axis direction), the left-right direction (X-axis direction), and the front-rear direction (the Z-axis direction) of the controller 7. Data representing the acceleration as each of the components of the three axial directions detected by the acceleration sensor 701 is output to the communication section 75. Based on the acceleration data which is output from the acceleration sensor 701, a motion of the controller 7 can be detected. As the acceleration sensor 701, a sensor for detecting an acceleration in two of the three axial directions may be used in accordance with data required for a specific application.

The communication section 75 includes the microcomputer 751, a memory 752, the wireless module 753 and the antenna 754. The microcomputer 751 controls the wireless module 753 for transmitting the transmission data while using the memory 752 as a storage area during processing.

Data from the controller 7 including an operation signal (key data) from the operation section 72, acceleration signals in the three axial directions (X-axis, Y-axis and Z-axis direction acceleration data) from the acceleration sensor 701, and the processing result data from the imaging information calculation section 74 are output to the microcomputer 751. The microcomputer 751 temporarily stores the input data (key data, X-axis, Y-axis and Z-axis direction acceleration data, and the processing result data) in the memory 752 as the transmission data which is to be transmitted to the receiving unit 6. The wireless transmission from the communication section 75 to the receiving unit 6 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the receiving unit 6, the microcomputer 751 outputs the transmission data stored in the memory 752 as a series of operation information to the wireless module 753. The wireless module 753 uses, for example, the Bluetooth (registered trademark) technology to radiate the operation information from the antenna 754 as a carrier wave signal of a predetermined frequency. Thus, the key data from the operation section 72, the X-axis, Y-axis and Z-axis direction acceleration data from the acceleration sensor 701, and the processing result data from the imaging information calculation section 74 are transmitted from the controller 7. The receiving unit 6 of the game apparatus 3 receives the carrier wave signal, and the game apparatus 3 demodulates or decodes the carrier wave signal to obtain the series of operation information (the key data, the X-axis, Y-axis and Z-axis direction acceleration data, and the processing result data). Based on the obtained operation information and the game program, the CPU 30 of the game apparatus 3 performs the game processing. In the case where the communication section 75 is structured using the Bluetooth (registered trademark) technology, the communication section 75 can have a function of receiving transmission data which is wirelessly transmitted from other devices.

(First Embodiment)

Figure 7:
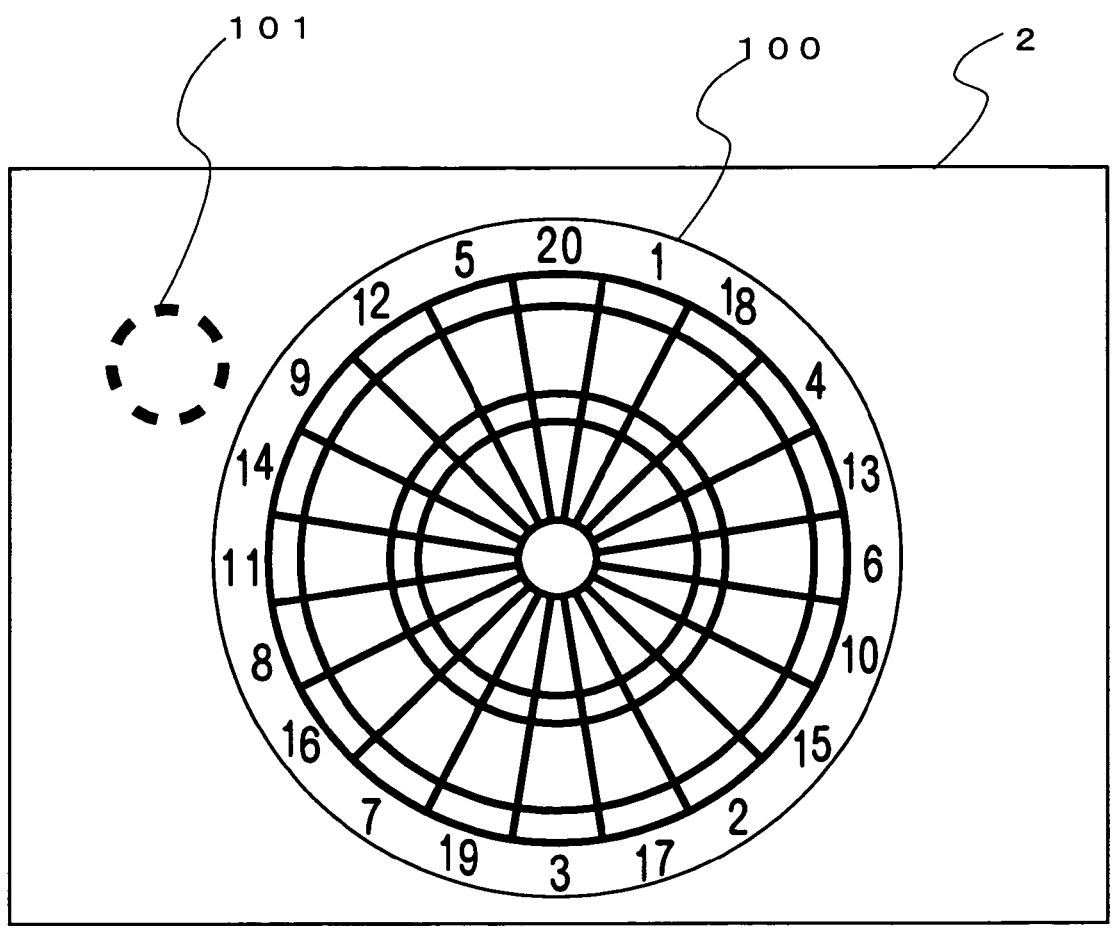
FIG. 7 shows an exemplary game image of a game playable in the first embodiment.
Figure 8:
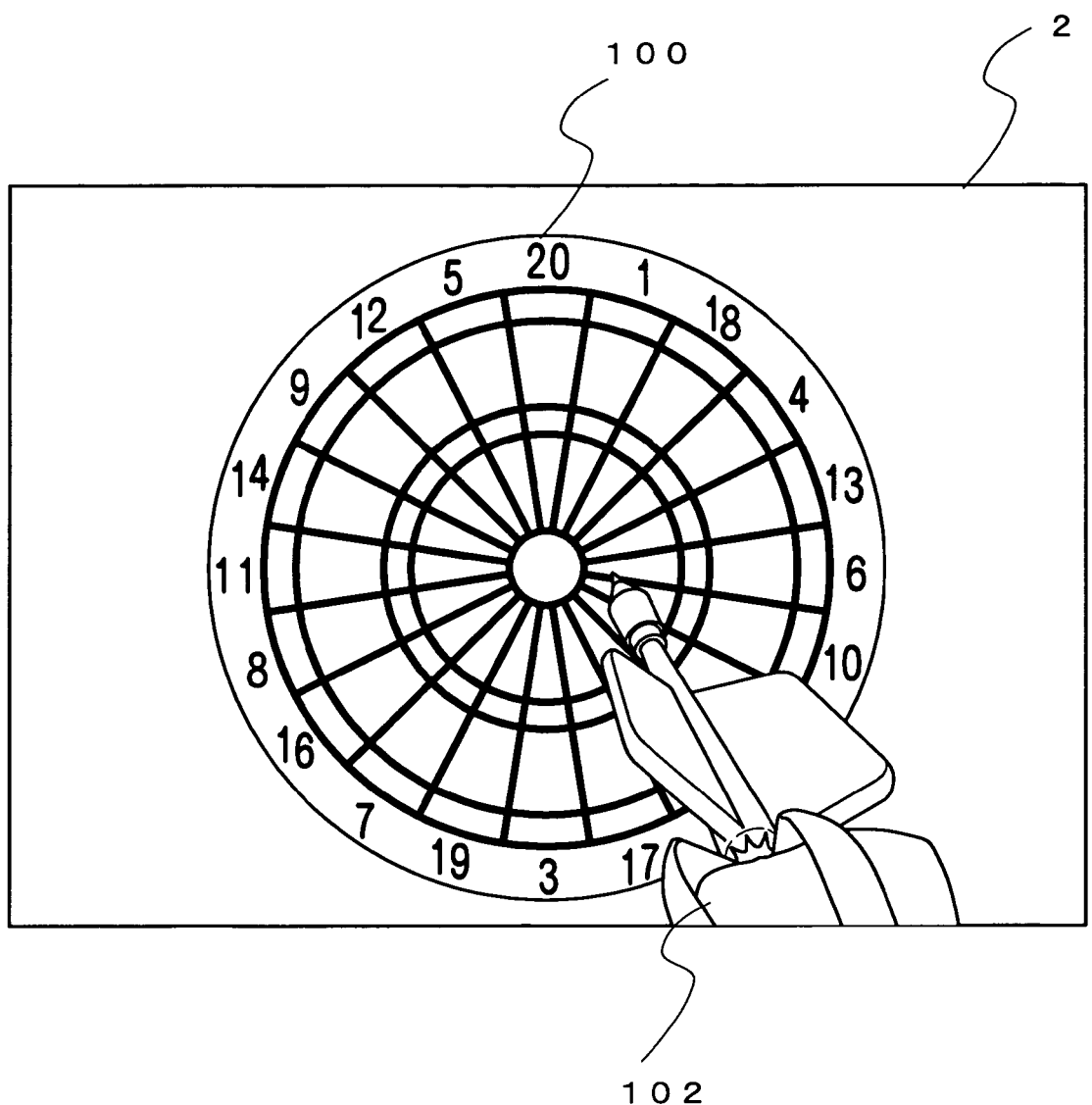
FIG. 8 shows another exemplary game image of the game playable in the first embodiment.
Figure 9:
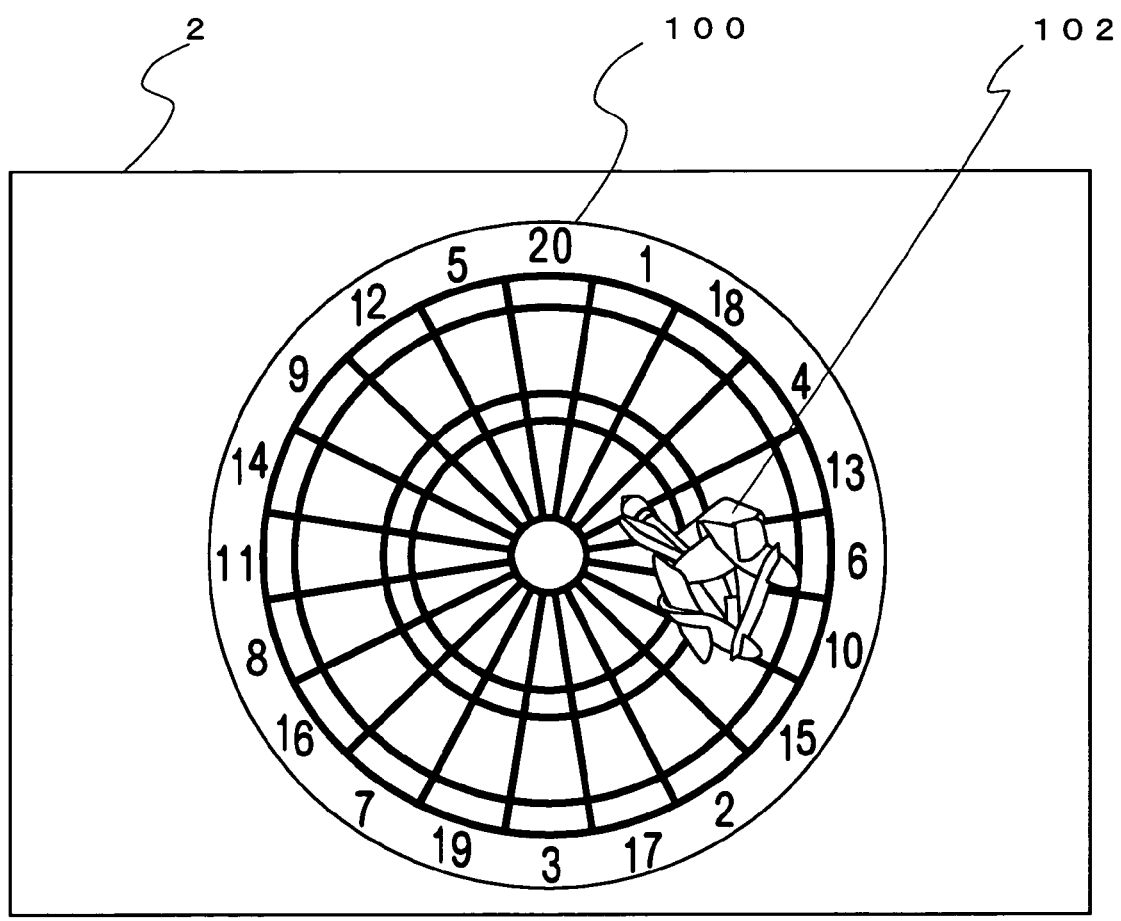
FIG. 9 shows still another exemplary game image of the game playable in the first embodiment.

With reference to FIG. 7 through FIG. 9, an overview of a game playable with the game apparatus 3 in the first embodiment will be described. FIG. 7 shows an exemplary game image of a game playable with the game apparatus 3 in the first embodiment. The game is a dart game. FIG. 7 shows a dart board 100 and a cursor 101 displayed on the screen of the monitor 2. The player holds the controller 7 as if he/she was holding a dart with the front surface of the controller 7 directed toward the monitor 2. In this state, the player moves the controller 7 upward, downward, rightward or leftward, so that the cursor 101 is moved. The cursor 101 is displayed as moving along the indicated position calculated using the coordinate set representing the position of each of the markers 8L and 8R in the image taken by the imaging information calculation section 74 of the controller 7. The player places the cursor 101 at the position which he/she intends to hit with a dart, and then pushes the controller 7 slightly forward with some momentum as if he/she was throwing a dart. An acceleration of the controller 7 in the Z-axis direction (toward the monitor 2) is checked at a predetermined time interval (e.g., every 1/30 sec.) during the operation of pushing the controller 7 (pushing operation), and the instant when the acceleration exceeded a predetermined value (the time when the dart is regarded as having left the player's hand) is detected. The position of the cursor 101 at this instant is established as a target position which the dart is to hit. In addition, a change in the acceleration in the Z-axis direction (toward the monitor 2) during a sequence of the pushing operation is checked, so that a start time of the pushing operation is obtained. Based on the difference between the start time and the instant when the acceleration exceeded the predetermined value, the speed of the dart is calculated. As a result, as shown in FIG. 8 and FIG. 9, a dart 102 is displayed as flying toward the dart board 100 (more accurately, the target position) at the calculated speed. With this dart game, the controller 7 is considered as the dirt 102. Each player moves the controller 7 as if he/she was throwing the dart 102 toward the dart board 100 displayed on the screen to get a point. Instead of giving the players points, the game may be played with the rule that the player succeeds if the dart 102 hits a position within an intended area of the dart board 100 and fails otherwise.

Figure 10:
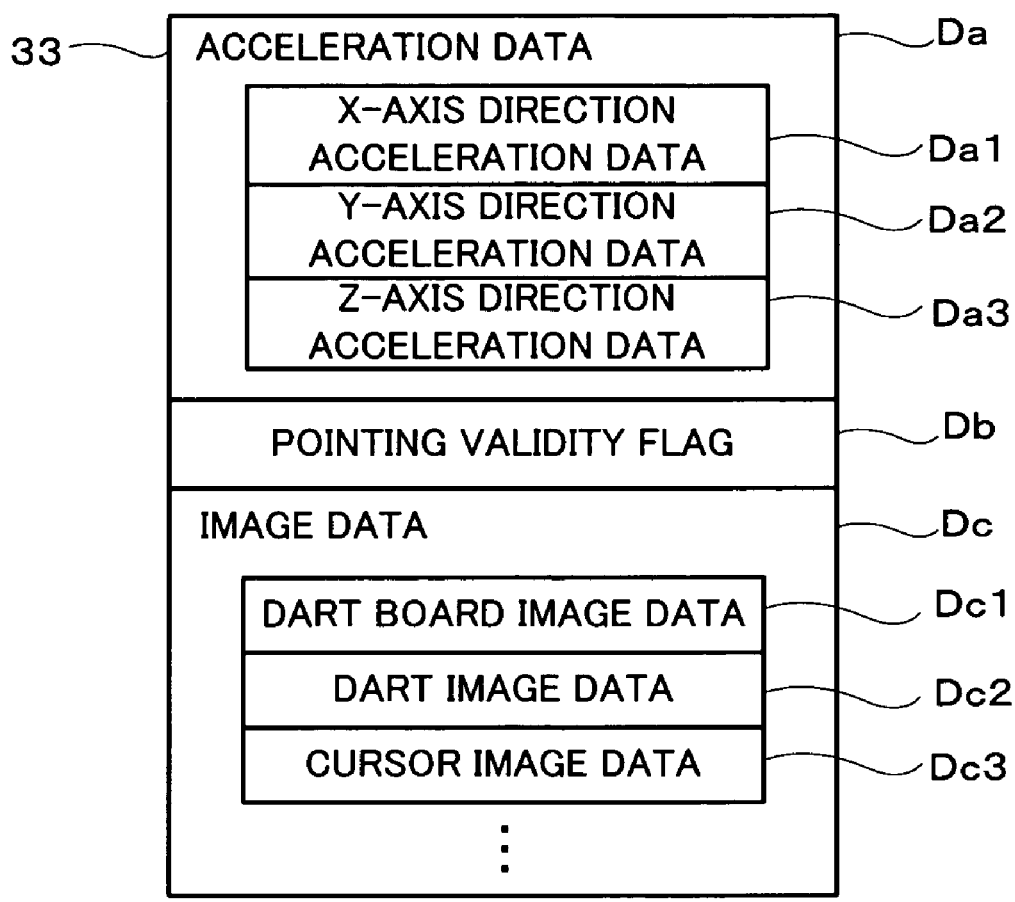
FIG. 10 shows main data stored on a main memory 33 of the game apparatus 3 in the first embodiment.

Next, the game processing executed by the game system 1 will be described in detail. With reference to FIG. 10, main data used for the game processing in the first embodiment will be described. FIG. 10 shows main data stored on the main memory 33 of the game apparatus 3 in the first embodiment.

As shown in FIG. 10, the main memory 33 has stored thereon acceleration data Da, a pointing validity flag Db, image data Dc and the like. The main memory 33 has stored thereon data regarding a virtual game space (topographical data, etc.) and other data required for the game processing as well as the above-described data.

The acceleration data Da is included in a series of operation information transmitted from the controller 7 as transmission data. Data on accelerations obtained by the controller 7 corresponding to a predetermined number of frames (for example, 30 frames) is stored. One frame (1/60 sec.) is a game processing interval. The acceleration data Da includes X-axis direction acceleration data Da1, Y-axis direction acceleration data Da2, and Z-axis direction acceleration data Da3, each of which is detected by the acceleration sensor 701 as a component of each of X-, Y-, and Z-axes. The receiving unit 6 included in the game apparatus 3 receives the acceleration data Da included in the operation information which is transmitted from the controller 7 at a predetermined interval of, for example, 5 ms, and stores the acceleration data in a buffer (not shown) in the receiving unit 6. Then, the acceleration data is read in units of a frame, which is a game processing interval, and is stored in the main memory 33.

The pointing validity flag Db indicates whether or not the front surface of the controller 7 having the imaging element 743 thereon is directed toward the monitor 2, i.e., whether or not a position in the coordinate system of the screen of the monitor 2 is indicated (pointed to) by the controller 7. When the front surface of the controller 7 is not directed toward the monitor 2, the pointing validity flag Db is off.

The image data Dc includes dart board image data Dc1, dart board image data Dc2, cursor image data Dc3 and the like, and is used for locating the dart board 100 and the dart 102 in the virtual game space to generate a game image.

Figure 11:
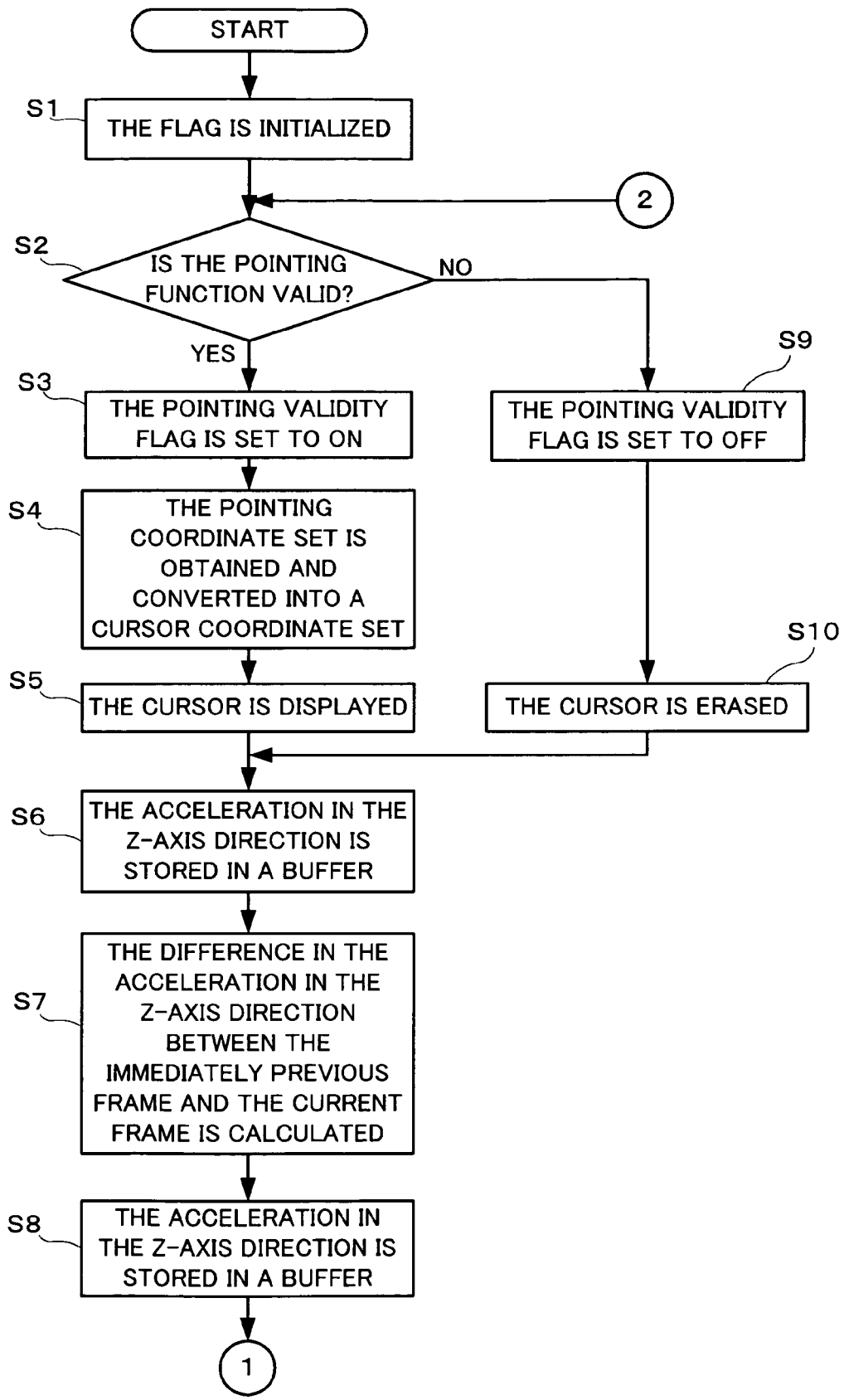
FIG. 11 is a flowchart illustrating a flow of game processing executed by the game apparatus 3 in the first embodiment.
Figure 12:
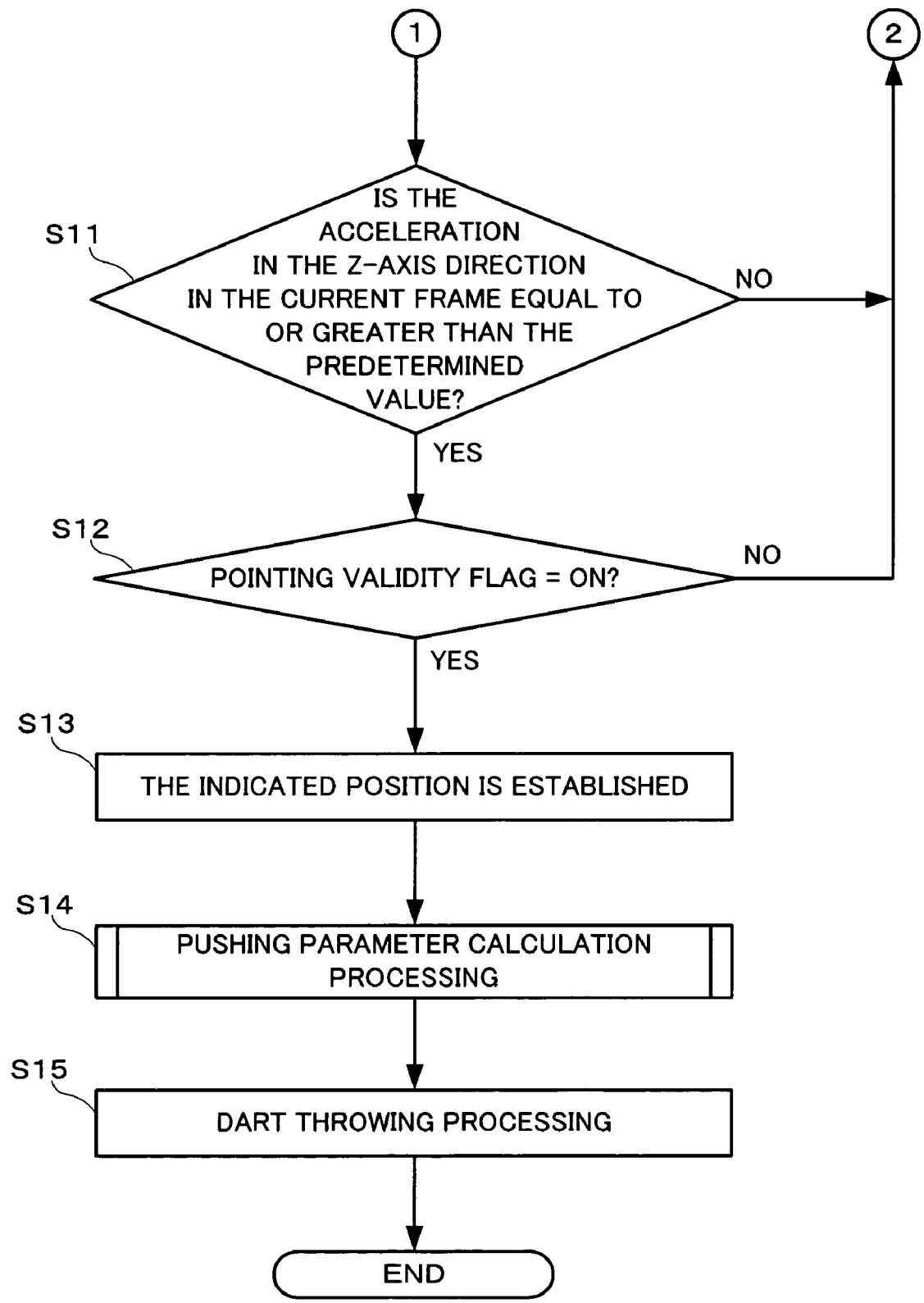
FIG. 12 is a flowchart illustrating a flow of the game processing executed by the game apparatus 3 in the first embodiment.
Figure 13:
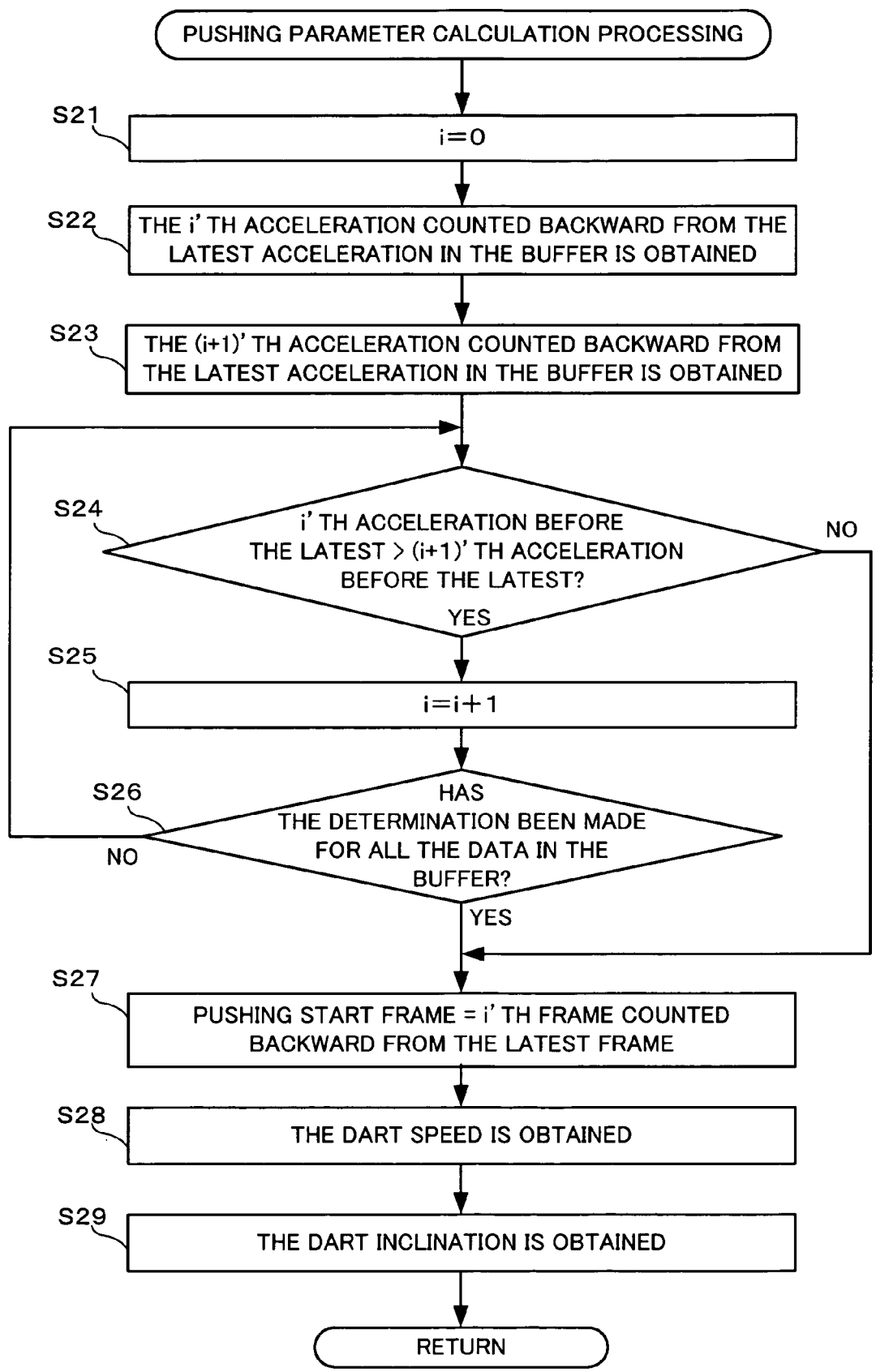
FIG. 13 is a flowchart illustrating pushing parameter calculation processing in step 14 shown in FIG. 12 in detail.

With reference to FIG. 11 through FIG. 13, the game processing executed by the game apparatus 3 will be described in detail. FIG. 11 and FIG. 12 are a flowchart illustrating a flow of the game processing executed by the game apparatus 3. FIG. 13 is a flowchart illustrating pushing parameter calculation processing in step 14 shown in FIG. 12 in detail. The flowcharts in FIG. 11 through FIG. 13 illustrate the processing executed in accordance with the game operation performed by the player of pushing the controller 7 considered as a dart. The other game processing which is not directly relevant to the present invention will not be described in detail. In FIG. 11 through FIG. 13, the "steps" of the processing executed by the CPU 30 will be referred to simply as "S".

When the game apparatus 3 is turned on, the CPU 30 of the game apparatus 3 executes a start program stored in a boot ROM (not shown) to initialize the elements including the main memory 33. The game program stored on the optical disc 4 is read to the main memory 33, and thus the CPU 30 starts executing the game program. The flowcharts shown in FIG. 11 and FIG. 12 illustrate the game processing executed after the above-described processing is completed. The processing loop of steps 1 through 15 shown in FIG. 11 and FIG. 12 is repeated for each frame.

Referring to FIG. 11, the CPU 30 initializes the pointing validity flag Db (step 1). Next, the CPU 30 checks whether or not the function of the controller 7 of indicating a position on the game image (hereinafter, referred to as a "pointing function") is valid (step 2). This determination is performed based on, for example, whether or not the processing result data which is output from the imaging information calculation section 74 indicates that an image of the infrared light output from the marker 8L or 8R is taken. When no image of the infrared light from the marker 8L or 8R is taken (NO in step 2), it is considered that the front surface of the controller 7 is not directed toward the monitor 2. Therefore, the CPU 30 sets pointing validity flag Db to off (step 9). Then, the CPU 30 switches the cursor 101 to a non-display state (step 10) and advances the processing to step 6.

By contrast, when an image of the infrared light from the marker 8L or 8R is taken (YES in step 2), it is considered that the front surface of the controller 7 is directed toward the monitor 2. Therefore, the CPU 30 sets the pointing validity flag Db to on (step 3). Then, from the series of operation information transmitted from the controller 7 as transmission data, the CPU 30 obtains an input coordinate set in the coordinate system of the screen of the monitor 2, i.e., a coordinate set of the position indicated by the controller 7 (pointing coordinate set) and converts the pointing coordinate set into a cursor coordinate set in the coordinate system of the virtual game space (step 4). The cursor coordinate set represents a position of the cursor 101 in the virtual game space, and the conversion is performed using, for example, linear conversion.

Then, the CPU 30 displays the cursor 101 based on the cursor coordinate set obtained as a result of the conversion (step 5).

From the series of information transmitted from the controller 7 as the transmission data, the CPU 30 obtains an acceleration in the Z-axis direction (hereinafter, referred to as a "Z-axis acceleration") (step 6).

The CPU 30 obtains a difference between the Z-axis acceleration obtained in step 6 (the Z-axis acceleration in the current frame) and the Z-axis acceleration in the immediately previous frame (step 7).

The CPU 30 stores the Z-axis acceleration in the current frame in a buffer (not shown) in the main memory 33 (step 8). In this manner, the CPU 30 accumulates the acceleration data in the buffer. The buffer is a ring buffer having a buffer size of 20.

The CPU 30 determines whether or not the Z-axis acceleration in the current frame exceeds a predetermined value (step 11 in FIG. 12). In this game, the time when the Z-axis acceleration exceeds the predetermined value is regarded as the time when the dart leaves the player's hand. The determination in step 11 is performed to determine when the dart left the player's hand, i.e., a termination point of the pushing operation. When it is determined that the Z-axis acceleration does not exceed the predetermined value (NO in step 11), the CPU 30 returns the processing to step 2 and repeats the above-described processing.

By contrast, when it is determined that the Z-axis acceleration exceeds the predetermined value (YES in step 11), the CPU 30 determines whether or not the pointing validity flag Db is on (step 12). When it is determined that the pointing validity flag Db is off (NO in step 12), the CPU 30 returns the processing to step 2 and repeats the above-described processing. When it is determined that the pointing validity flag Db is on (YES in step 12), the CPU 30 establishes the cursor coordinate set as the target position for the dart 102 (step 13). In other words, the position indicated by the player is established.

Figure 14:
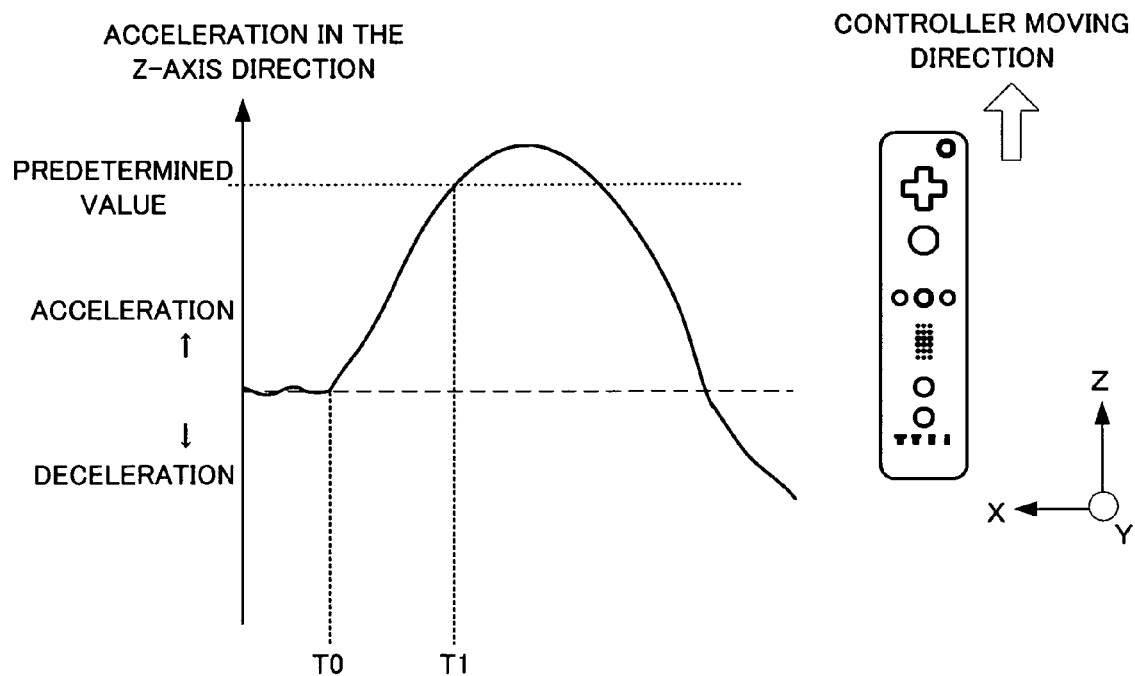
FIG. 14 shows a graph illustrating a change in the acceleration during a pushing operation.

The CPU 30 executes pushing parameter calculation processing (step 14) in order to calculate the flying speed or the like of the dart 102. By this processing, the waveform of the accelerations during the pushing operation as shown in FIG. 14 is checked backward from the time when the acceleration exceeds the predetermined value (T1 in FIG. 14), in order to find a start time of the pushing operation (T0 in FIG. 14; the time when the acceleration is started).

FIG. 13 is a flowchart illustrating the pushing parameter calculation processing in step 14 in detail. Referring to FIG. 13, the CPU 30 first sets variable i, which represents the frame to be checked, to 0 (step 21). Then, the CPU 30 obtains the i'th Z-axis acceleration counted backward from the latest (current) acceleration in the acceleration data stored in the buffer (step 22). Next, the CPU 30 obtains the (i+1)th Z-axis acceleration counted backward from the newest acceleration (step 23).

The CPU 30 determines whether or not the i'th Z-axis acceleration is greater than the (i+1)th Z-axis acceleration (step 24). When it is determined that the i'th Z-axis acceleration is greater than the (i+1)th Z-axis acceleration (YES in step 24), the CPU 30 adds 1 to the value of variable i (step 25). Then, the CPU 30 determines whether or not the above-described determination has been performed on all the Z-axis accelerations stored in the buffer (step 26). When it is determined that the above-described determination has not been performed on all the Z-axis accelerations stored in the buffer (NO in step 26), the CPU 30 returns the processing to step 24. When it is determined that the above-described determination has been performed on all the Z-axis accelerations stored in the buffer (YES in step 26), the CPU 30 advances the processing to the next step. In this embodiment, the value of the Z-axis acceleration is provided in the case where the controller 7 is pushed in a positive direction. Alternatively, the value of the Z-axis acceleration may be provided in the case where the controller 7 is pushed in a negative direction. In this case, it is determined in step 24 whether or not the i'th Z-axis acceleration is less than the (i+1)th Z-axis acceleration (i'th Z-axis acceleration<(i+1)th Z-axis acceleration).

When it is determined in step 24 that the i'th Z-axis acceleration is not greater than the (i+1)th Z-axis acceleration (NO in step 24), the i'th frame counted backward from the current frame is considered to be the frame in which the pushing operation started, i.e., the start point T0. Therefore, the i'th frame counted backward from the current frame is established as a start frame (step 27).

Then, the CPU 30 determines the flying speed of the dart 102 based on the number of frames until the current frame from the i'th frame counted backward from the current frame (i.e., the time duration from the start point until the termination point of the pushing operation) (step 28). For example, the flying speed is calculated so as to be in inverse proportion to the time duration from the start point until the termination point of the pushing operation. The CPU 30 also calculates the inclination of the controller 7 during the pushing operation based on the acceleration data (including the X-axis and Y-axis acceleration data in addition to the Z-axis acceleration data) in the start frame of the pushing operation (step 29). Namely, the CPU 30 checks the inclination of the dart 102 at the start point of the pushing operation. The pushing parameter calculation processing is executed in this manner.

Returning to FIG. 12, after the pushing parameter calculation processing in step 14 is finished, the CPU 30 executes processing of throwing the dart 102 based on the flying speed of the dart 102 obtained above (step 15). For calculating the trajectory or the like of the dart 102, a predetermined position is used as the throwing position. However, the dart 102 may be displayed as being thrown from a different position based on the inclination of the controller 7 obtained in step 29. For example, the controller 7 is held by the player's right hand and is inclined leftward, the dart 102 is displayed as flying from a position slightly right to the center of the screen (see FIG. 9). When the controller 7 is held by the player's left hand and is inclined rightward, the dart 102 is displayed as flying from a position slightly left to the center of the screen. When the calculated flying speed is equal to or greater than a predetermined value, the dart 102 is displayed as being stuck at the target position established in step 13. When the calculated flying speed is less than the predetermined value, the dart 102 is adjusted to be displayed as being stuck at a position slightly below the target position. Namely, the target position is varied in accordance with the calculated flying speed. The game processing in the first embodiment is executed in this manner.

As described above, in the first embodiment, the player can both specify a position and instructs an object how to move merely by moving an input device (controller 7) held in his/her hand in an intended direction with no reliance on a lever or button. This allows the player to operate in a novel and intuitive manner, and provides a new type of game. The player can operate the controller 7 as if he/she was throwing a dart or pulling an object in the real world, the result of which is reflected on the game. This makes the game more realistic, so that the player can feel as if he/she was present in the virtual game space. As a result, the game is made more amusing.

The above-described pushing operation may be used for selecting an item in a menu or pressing a button. For example, in a state where a menu is displayed on the screen and a cursor is put on the item to be selected, the player may perform the operation of pushing the controller 7 to select the item. In this case also, the player can feel as if he/she was present in the virtual game world and play intuitively.

(Second Embodiment)

Figure 15:
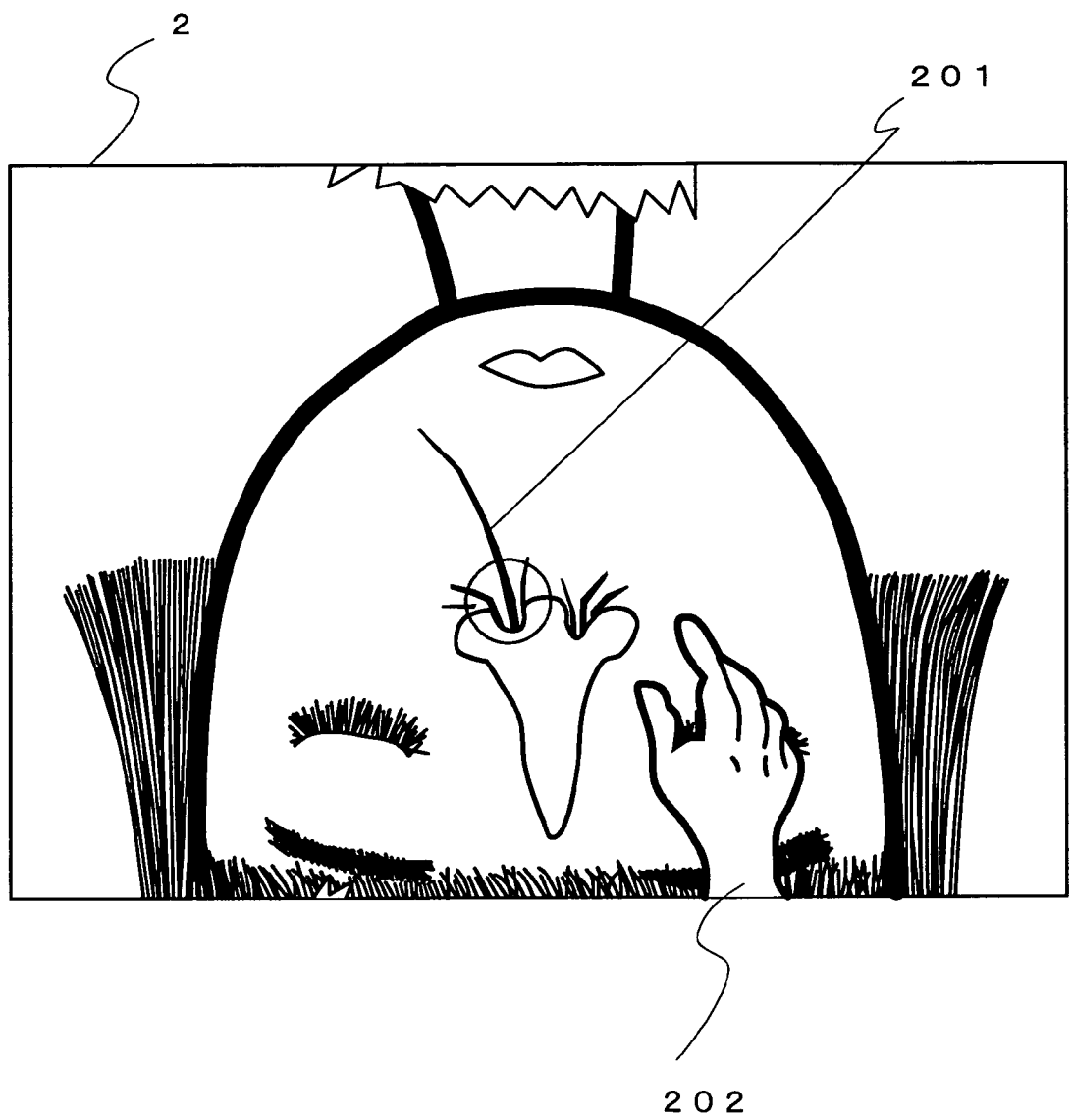
FIG. 15 shows an exemplary game image of a game playable in the second embodiment.
Figure 16:
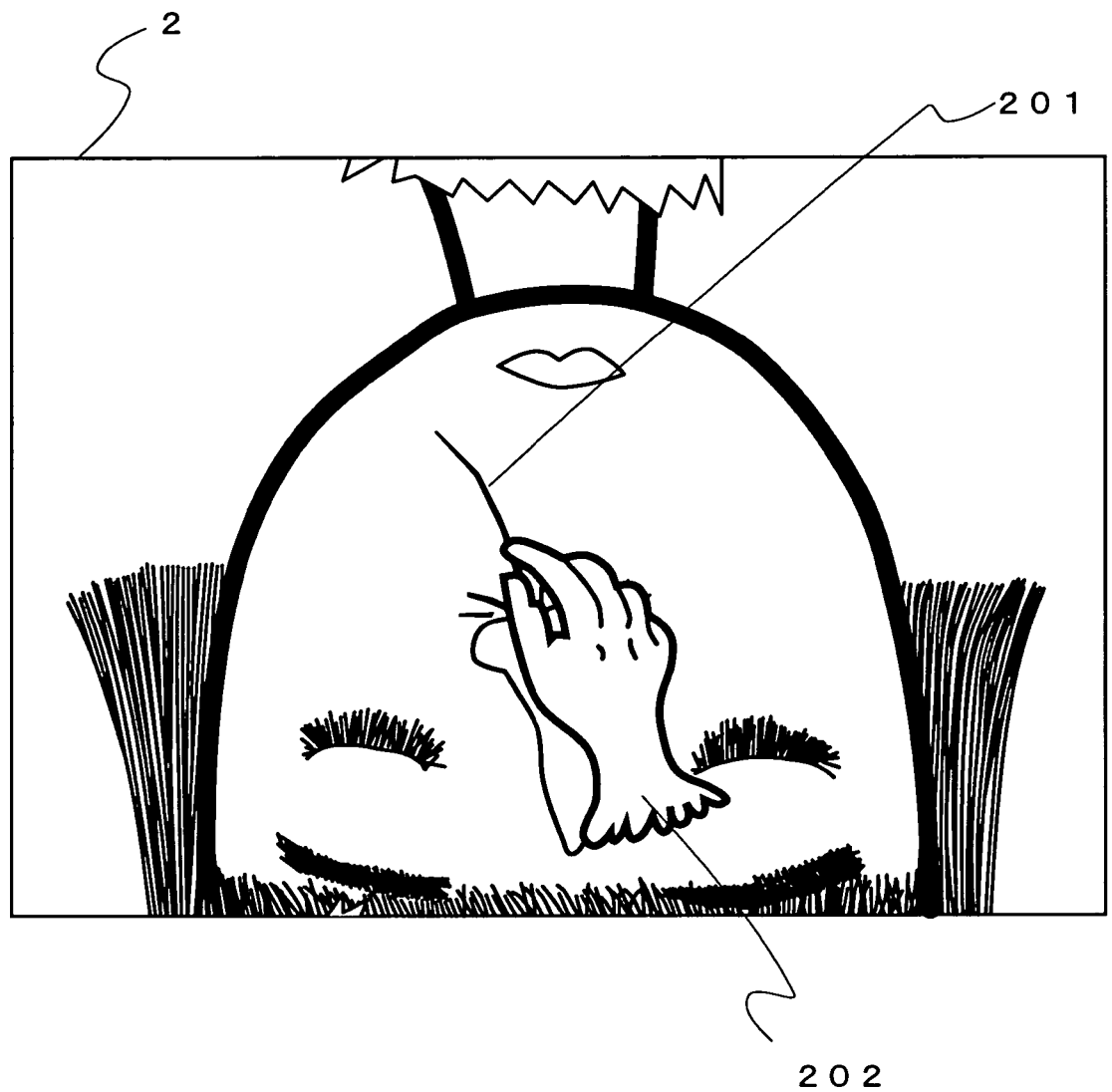
FIG. 16 shows another exemplary game image of the game playable in the second embodiment.
Figure 17:
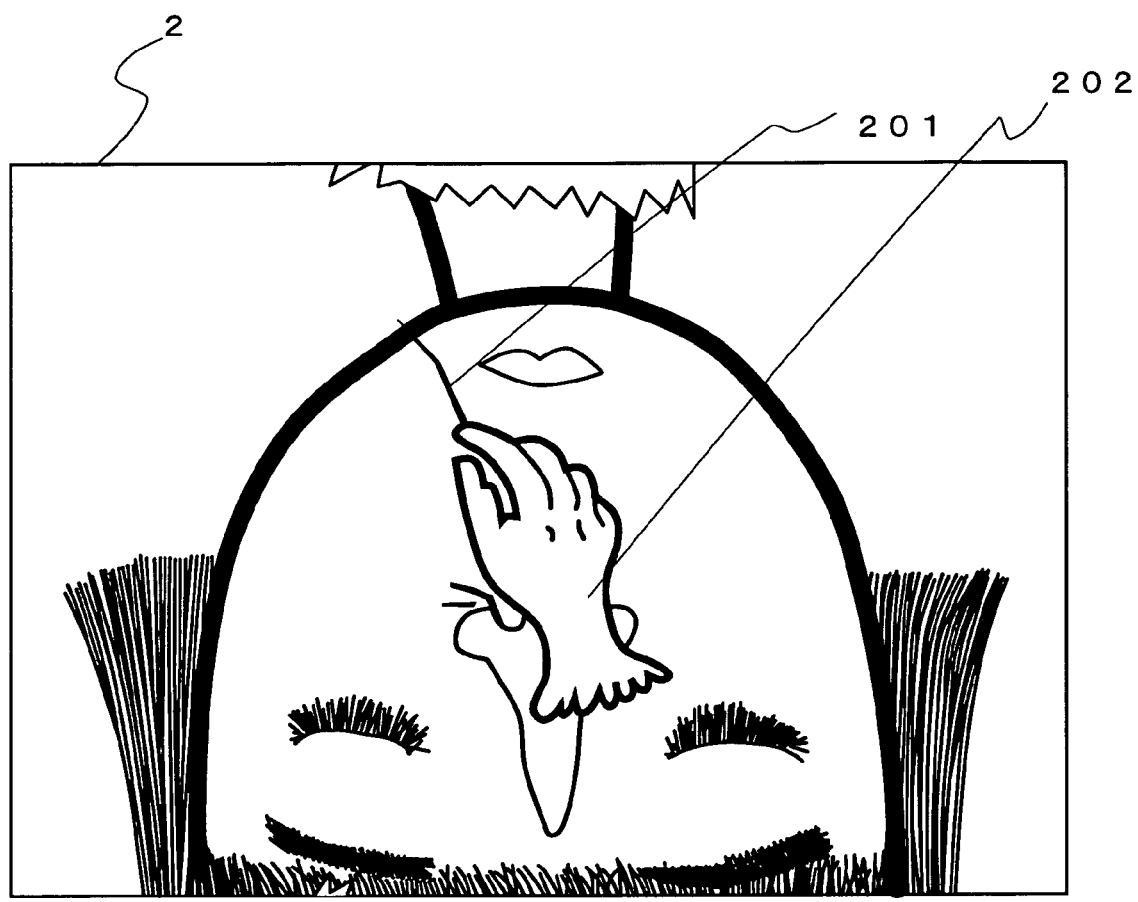
FIG. 17 shows still another exemplary game image of the game playable in the second embodiment.

With reference to FIG. 15 through FIG. 24, a second embodiment will be described. FIG. 15 through FIG. 17 each show an exemplary game image of a game playable with the game apparatus 3 in the second embodiment. The aim of the game is to pull out an object displayed on the screen within a predetermined time duration. FIG. 15 shows an object 201 which is a target of pulling (hereinafter, referred to as a "pulling target") and a cursor 202 in the shape of a hand. When such an image is displayed on the screen, the player directs the front surface of the controller 7 toward the monitor 2 and move his/her hand upward, downward, rightward or leftward to move the cursor 202. When the cursor 202 approaches the pulling target 201 as a result, as shown in FIG. 16, the display is changed to show that the cursor 202 is grasping the pulling target 201. In this state, the player moves the controller 7 upward with momentum as if he/she was pulling the pulling target 201 (i.e., performs a pulling operation). When the player moves the controller 7 with sufficient momentum (i.e., with a sufficient acceleration), an animation of the pulling target 201 being pulled is displayed. As a result, as shown in FIG. 17, the pulling target 201 is pulled out. The pulling operation is successful. By contrast, when the player moves the controller 7 with insufficient momentum (i.e., with an insufficient acceleration), the pulling target 201 is not pulled out. An animation of the cursor 202 failing to pull out the pulling target 201 is displayed. The pulling operation is unsuccessful. If the player can pull out all a plurality of pulling targets displayed on the screen within a predetermined time duration as a result of repeating such an operation, the player achieves the aim of the game (succeeds in clearing the game). If the player cannot pull out all the plurality of pulling targets, the player does not achieve the aim of the game (fails to clear the game).

For simplifying the explanation, the above-described processing is divided into three states.

1. A "free" state in which the pulling target 201 is not grasped.

2. A "grasping" state in which the pulling target 201 is being grasped but has not been pulled yet.

3. A "pulling" state in which an animation of the pulling target 201 being pulled is displayed.

The state of the above-described processing is transferred as follows:

The "free" state→transferred to the "grasping" state as a result of the cursor 202 being moved→transferred to the "pulling" state as a result of the pulling operation;→transferred to the "free" state when the animation of the pulling target being pulled is finished.

Figure 18:
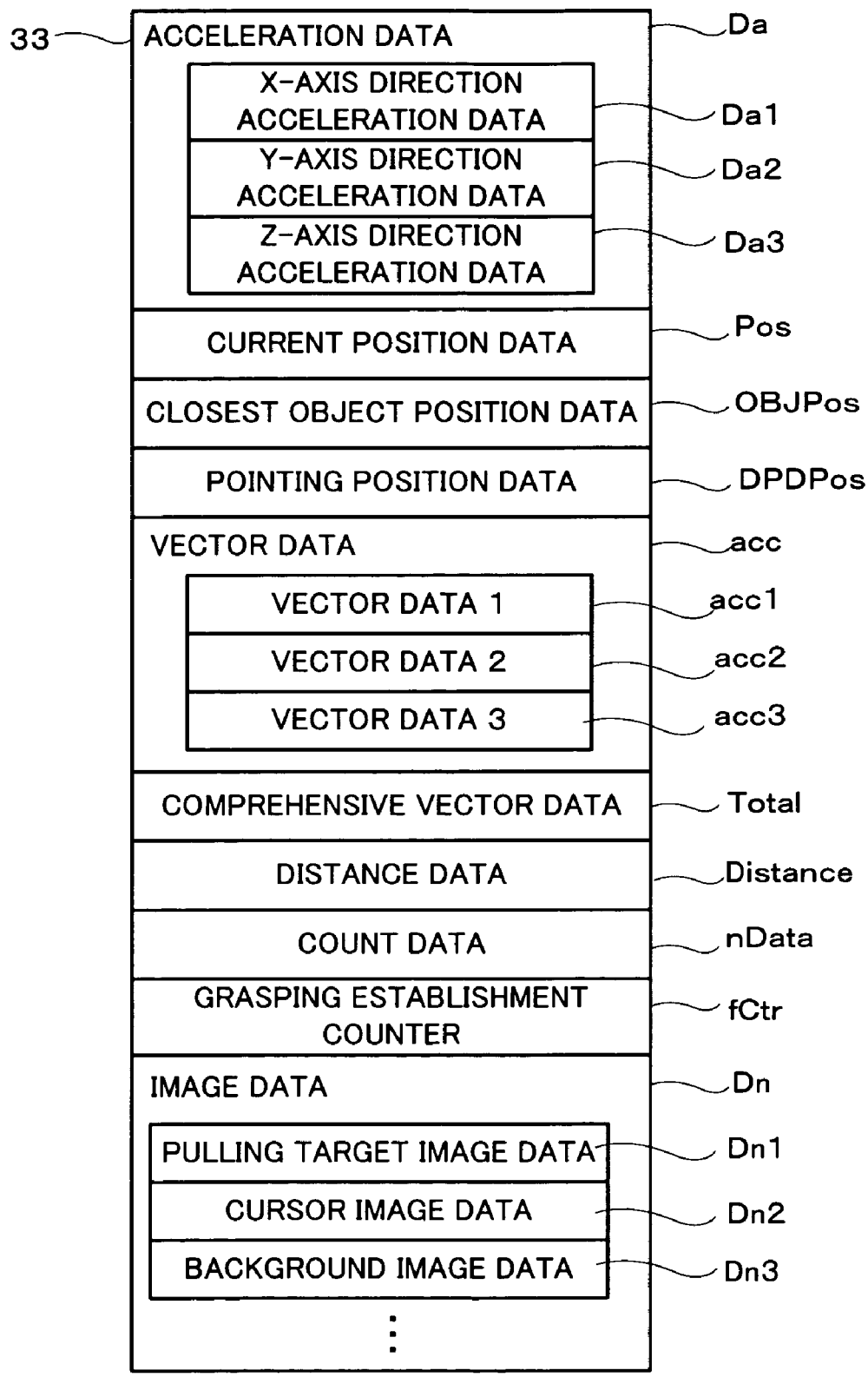
FIG. 18 shows main data stored on the main memory 33 of the game apparatus 3 in the second embodiment.

Next, with reference to FIG. 18, main data used for the game processing in the second embodiment will be described. FIG. 18 shows main data stored on the main memory 33 of the game apparatus 3 in the second embodiment.

As shown in FIG. 18, the main memory 33 has stored thereon acceleration data Da, current position data Pos, closest object position data OBJPos, pointing position data DPDPos, vector data acc1 through acc3, comprehensive vector data Total, distance data Distance, count data nData, a grasping establishment counter fCtr, image data Dn and the like. The main memory 33 has stored thereon data regarding the virtual game space (topographical data, etc.) and other data required for the game processing as well as the above-described data.

The acceleration data Da is substantially the same as that in the first embodiment, and will not be described in detail here.

The current position data Pos represents the current position of the cursor 202. The closest object position data OBJ- Pos represents the position of a pulling target 201 which is the closest to the cursor 202 among a plurality of pulling targets. The pointing position data DPDPos represents the position pointed to by the player with the controller 7.

The vector data acc1 through acc3 and the comprehensive vector data Total are mainly used for detecting an acceleration during the pulling operation as described below with reference to the flowcharts.

The distance data Distance represents the distance between the cursor 202 and the pulling target 201 closest to the cursor 202. The count data nData and the grasping establishment counter fCtr represent the count value used in the processing described below with reference to the flowcharts.

Figure 19:
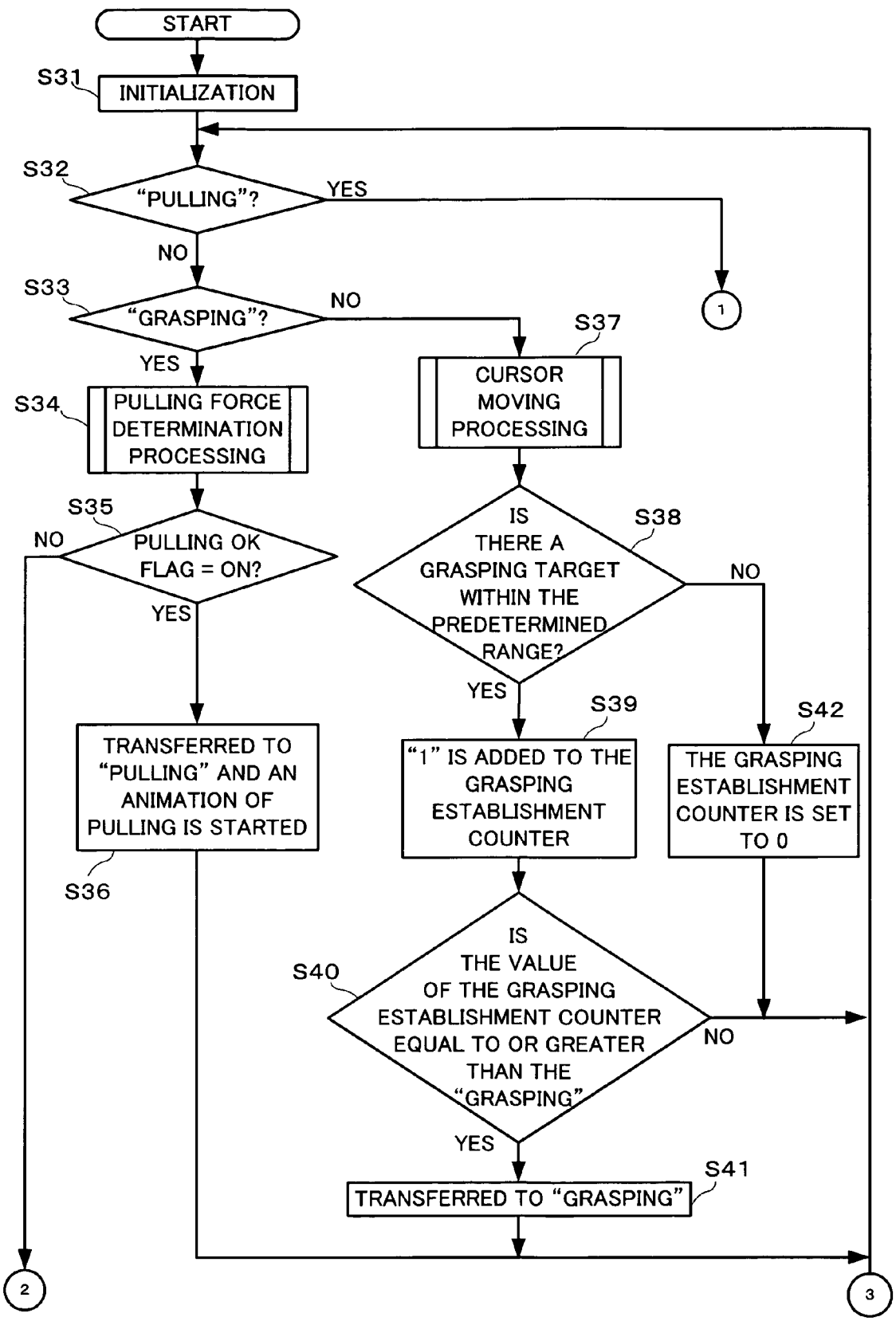
FIG. 19 is a flowchart illustrating a flow of game processing executed by the game apparatus 3 in the second embodiment.
Figure 20:
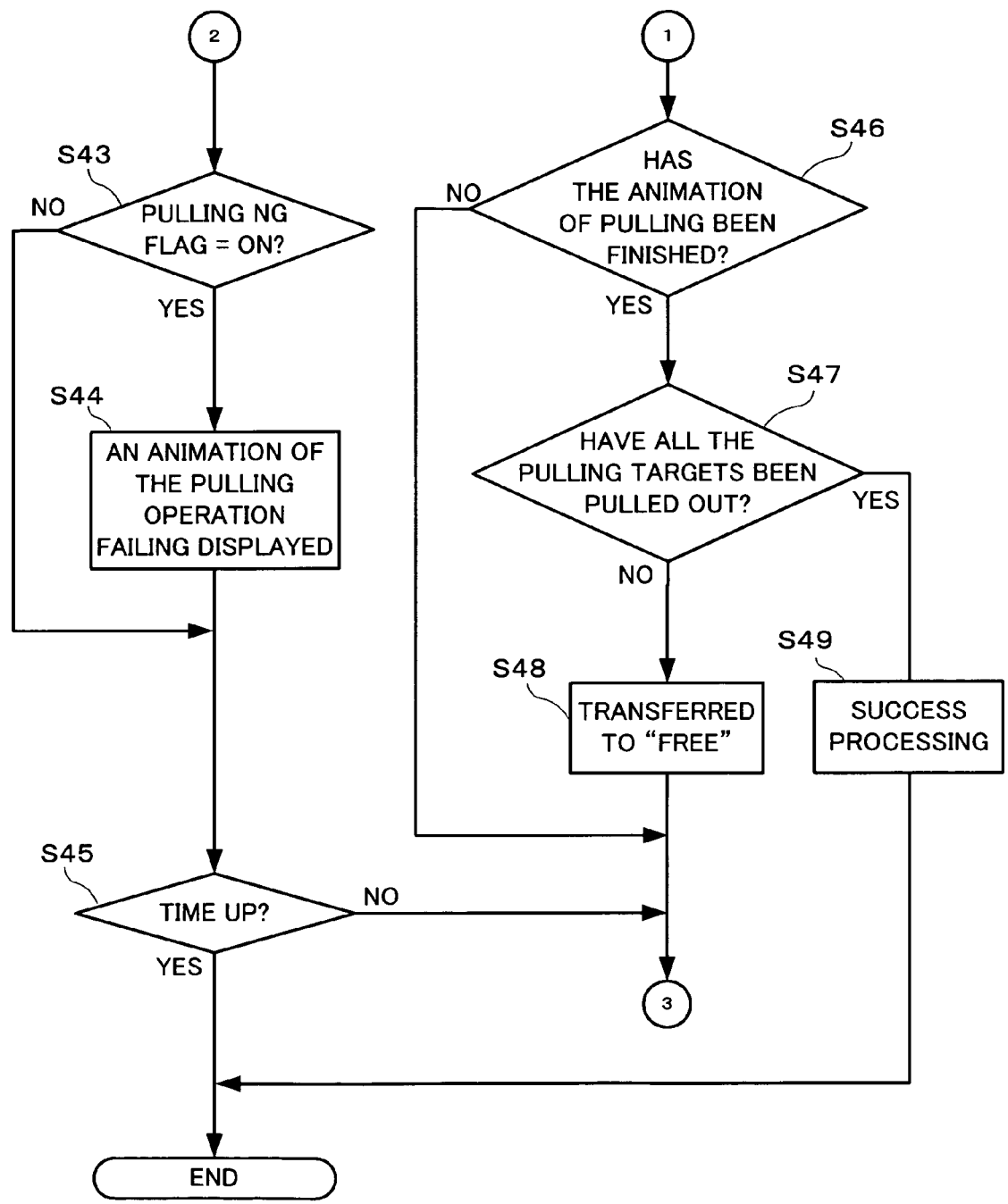
FIG. 20 is a flowchart illustrating a flow of the game processing executed by the game apparatus 3 in the second embodiment.

With reference to FIG. 19 through FIG. 24, the game processing executed by the game apparatus 3 in the second embodiment will be described in detail. FIG. 19 and FIG. 20 are a flowchart illustrating a flow of the game processing executed by the game apparatus 3 in the second embodiment.

When the game apparatus 3 is turned on, the CPU 30 of the game apparatus 3 executes a start program stored in a boot ROM (not shown) to initialize the elements including the main memory 33. The game program stored on the optical disc 4 is read to the main memory 33, and thus the CPU 30 starts executing the game program. The flowcharts shown in FIG. 19 and FIG. 20 illustrate the game processing executed after the above-described processing is completed. The processing loop of steps 31 through 49 shown in FIG. 19 and FIG. 20 is repeated for each frame.

Referring to FIG. 19, the CPU 30 sets the state to "free" and initializes various data (step 31). Then, the CPU 30 determines whether or not the state is "pulling" (step 32). When it is determined that the state is not "pulling" (NO in step 32), the CPU 30 determines whether or not the state is "grasping" (step 33). When it is determined that the state is not "grasping" (NO in step 33), the CPU 30 determines that the state is "free" and executes cursor moving processing (step 37). By this processing, the cursor 202 is moved to the position pointed to by the player with the controller 7 (described below in more detail).

When the cursor moving processing is finished, the CPU 30 determines whether or not there is a pulling target 201 within a predetermined range from the position of the cursor 202 (step 38). When it is determined that there is a pulling target 201 within the predetermined range from the position of the cursor 202 (YES in step 38), the CPU 30 adds 1 to the value of the grasping establishment counter fCtr (step 39). The grasping establishment counter fCtr is provided for counting the time duration in which the cursor 202 stays in the vicinity of the pulling target 201 in order to confirm the "intention to grasp" of the player. Next, the CPU 30 determines whether or not the value of the grasping establishment counter fCtr is equal to or greater than a predetermined value (step 40). When it is determined that the value of the grasping establishment counter fCtr is equal to or greater than the predetermined value (YES in step 40), the CPU 30 transfers the state to "grasping" (step 41) and returns the processing to step 32. By contrast, when it is determined that the value of the grasping establishment counter fCtr is less than the predetermined value (NO in step 40), the CPU 30 returns the processing to step 32 with no further processing. As described above, when the cursor 202 stays in the vicinity of the pulling target 201 for a certain time duration after approaching the pulling target 201, it is determined that the player has an intention to grasp, and thus the processing of grasping the pulling target 201 is executed. In this way, the situation can be avoided where the cursor 202 grasps the pulling target 201 immediately after approaching the pulling target 201 with excessive responsiveness although the player merely intends to let the cursor 202 to pass over the pulling target 201. Thus, the operability is prevented from being lowered.

When it is determined in step 33 that the state is "grasping" (YES in step 33), the CPU 30 changes the display to show that the cursor 202 is grasping the pulling target 201 (see FIG. 16), and executes pulling force determination processing (step 34). By this processing, an upward acceleration is detected in order to determine whether or not the pulling operation was performed and also determine the level of momentum with which the pulling operation was performed (described below in more detail). After the state is transferred to "grasping", no processing on the position indicated by the controller 7 is executed until the state is returned to "free".

After step 34, the CPU 30 determines whether or not a pulling OK flag is on (step 35). The pulling OK flag indicates that the player performed the pulling operation with a sufficient acceleration (i.e., with sufficient momentum) to successfully pull out the pulling target 201. Namely, in step 35, it is determined whether or not the pulling operation was performed with sufficient momentum to successfully pull out the pulling target 201. When it is determined that the pulling OK flag is on (YES in step 35), the CPU 30 determines that the pulling operation was performed with sufficient momentum and transfers the state to "pulling". The CPU 30 also starts the processing of displaying a prepared animation of the pulling target 201 being pulled (step 36). The animation has several tens of frames. Then, the CPU 30 returns the processing to step 32.

By contrast, when it is determined in step 35 that the pulling OK flag is off (NO in step 35), the CPU 30 determines whether or not a pulling NG flag is on (step 43 in FIG. 20). The pulling NG flag indicates that the pulling operation was performed but the momentum was insufficient to successfully pull out the pulling target 201. Namely, in step 43, it is determined whether or not the pulling operation itself was performed although the momentum was insufficient. When it is determined that the pulling NG flag is on (YES in step 43), this means that the pulling operation was performed (an upward acceleration equal to or greater than the predetermined value was detected) but the momentum was insufficient to successfully pull out the pulling target 201. Therefore, the CPU 30 displays an animation of the pulling operation failing, i.e., an animation of the cursor 202 and the pulling target 201 vibrating (step 44). Then, the CPU 30 determines whether or not the predetermined time duration has passed (step 45). When it is determined the predetermined time duration has not passed yet (NO in step 45), the CPU 30 returns the processing to step 32. When it is determined the predetermined time duration has passed (YES in step 45), the CPU 30 displays, for example, a message that the pulling operation results in a failure and terminates the game processing.

By contrast, when it is determined in step 43 that the pulling NG flag is off (NO in step 43), the pulling operation has not been completed. The CPU 30 advances the processing to step 45 to determine whether or not the predetermined time duration has passed.

When it is determined in step 32 (FIG. 19) that the state is "pulling" (YES in step 32), the CPU 30 determines whether or not the animation of the pulling target 201 being pulled has been finished (step 46 in FIG. 20). When it is determined that the animation has not been finished (NO in step 46), the CPU 30 returns the processing to step 32.

By contrast, when it is determined that the animation has been finished (YES in step 46), the CPU 30 determines whether or not all the pulling targets 201 have been pulled out (step 47). When it is determined that all the pulling targets 201 have been pulled out (YES in step 47), the CPU 30 executes success processing, for example, adds a point (step 49), and terminates the game processing. By contrast, when it is determined that there is still at least one pulling target 201 which has not been pulled out (NO in step 47), the CPU 30 changes the display to show that the cursor 202 is grasping nothing (see FIG. 15) and transfers the state to "free" (step 48). Then, the CPU 30 returns the processing to step 32 and repeats the above-described processing. The game is played in this manner.

Figure 21:
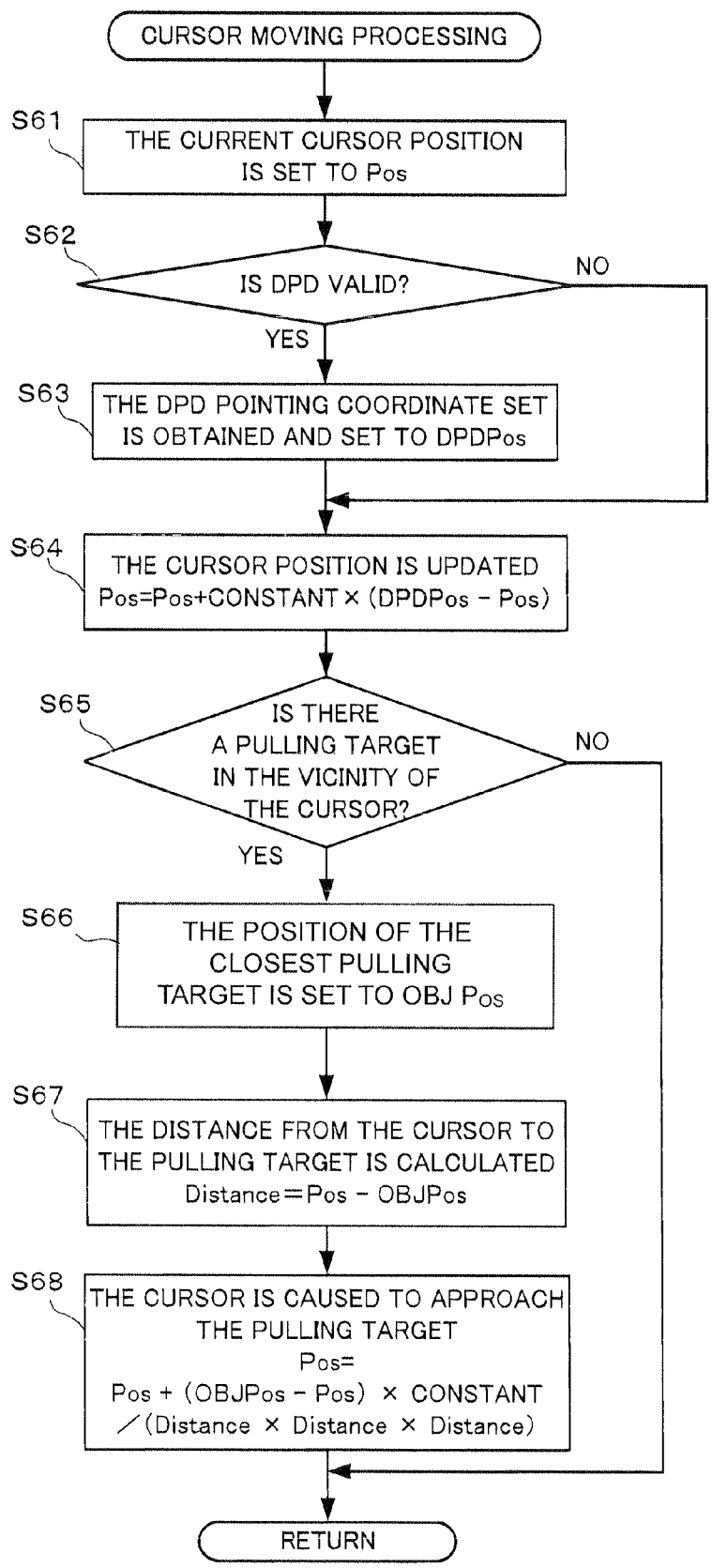
FIG. 21 is a flowchart illustrating cursor moving processing in step 37 shown in FIG. 19 in detail.

Now, the cursor moving processing in step 37 will be described in detail. FIG. 21 is a flowchart illustrating the cursor moving processing in step 37 in detail. Referring to FIG. 21, the CPU 30 first sets the coordinate set of the current cursor position (for example, the central coordinate set of the cursor 202) as the current position data Pos (step 61). Then, the CPU 30 determines whether or not the pointing function is valid (step 62). This processing is substantially the same as that in step 2 in the first embodiment described above with reference to FIG. 11, and will not be described in detail here. When it is determined that the pointing function is valid (YES in step 62), the CPU 30 obtains the coordinate set of the position pointed to by the controller 7 (pointing coordinate set). The CPU 30 converts the pointing coordinate set into a coordinate set in the coordinate system of the virtual game space, and sets the obtained coordinate set as the pointing position data DPDpos (step 63). The CPU 30 causes the coordinate set of the cursor 202 to approach the coordinate set of the pointing position data DPDpos, i.e., the position indicated by the player with the controller 7 (step 64). Specifically, the coordinate set of the cursor 202 is calculated by the following expression.

$$Pos=Pos+\text{constant}\times(DPDPos-Pos)$$

Next, the CPU 30 determines whether or not there is a pulling target 201 within a predetermined distance from the position of the cursor 202 (step 65). When it is determined that there is no pulling target 201 within the predetermined distance from the position of the cursor 202 (NO in step 65), the CPU 30 terminates the cursor moving processing.

By contrast, when it is determined that there is a pulling target 201 within the predetermined distance from the position of the cursor 202 (YES instep 65), the CPU 30 executes the following processing to adjust the coordinate set of the cursor 202 in order to represent the cursor 202 as being attracted to the pulling target 201. First, the CPU 30 sets the position of the pulling target 201 (for example, the central coordinate set of the pulling target 201) as the closest object position data OBJPos (step 66). Then, the CPU 30 obtains the distance data Distance by the following expression (step 67).

$$Distance=Pos-OBJPos$$

The CPU 30 causes the coordinate set of the cursor 202 to approach the coordinate set of the pulling target 201 (step 68). Specifically, the CPU 30 obtains the coordinate set of the cursor 202 by the following expression.

$$Pos=Pos+(OBJPos-Pos)\times\text{constant}/(Distance\times Distance\times Distance)$$

Thus, the cursor 202 approaches the pulling target 201 by a distance in inverse proportion to the square of the distance between the pre-step 68 position of the cursor 202 and the pulling target 201.

By such processing, the cursor 202 can be represented as being attracted to the pulling target 201 as approaching the pulling target 201. This eliminates the necessity of indicating the exact display position of the pulling target 201, and thus makes it easier for the cursor 202 to grasp the pulling target 201. As a result, the operability is improved. The cursor moving processing is executed in this manner.

Figure 22A:
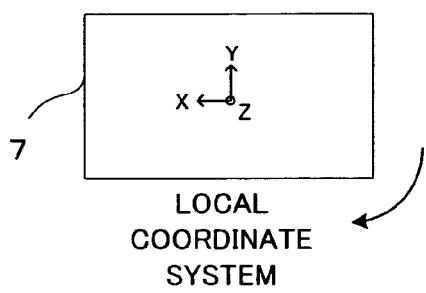
FIG. 22A through FIG. 22E show an overview of pulling force calculation processing in step 34 in FIG. 19.
Figure 22B:
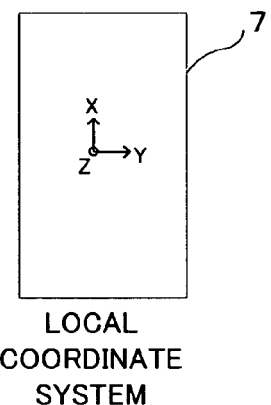
Figure 22C:
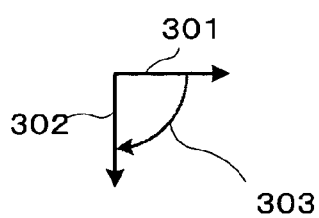
Figure 22D:
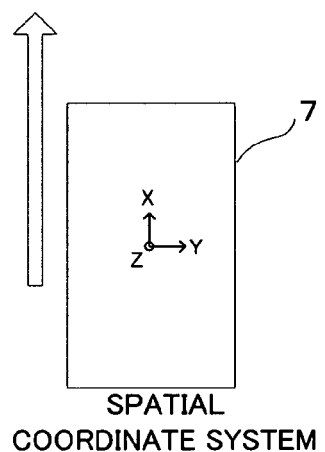

The pulling force determination processing in step 34 will be described in detail. An overview of the pulling force determination processing will be described with reference to FIG. 22. In the following description, the acceleration is represented as a vector. First, a rotation matrix for converting the coordinate system for the controller 7 (hereinafter, referred to as a "local coordinate system") into a spatial coordinate system (a rectangular coordinate system in which the direction of gravitational force is the negative Y-axis direction) is obtained. The rotation matrix is used in order to enable the controller 7 to be determined as being swung "upward" in the game processing as long as the controller 7 is swung "upward" as perceived by humans, regardless of the posture of the controller 7; e.g., regardless of whether the top surface, or one of the side surfaces, of the housing 71 of the controller 7 is directed upward. For example, in FIG. 22A, the controller 7 is in a horizontal state. When the controller 7 in this state is inclined at 90° clockwise as shown in FIG. 22B (the left side surface of the housing 71 is directed upward), a rotation matrix 303 is obtained as follows. As shown in FIG. 22C, the rotation matrix 303 is obtained from a vector 301 extending in the direction of gravitational force in the local coordinate system for the post-inclination controller 7 (extending in the negative X-axis direction) and a vector 302 extending in the direction of gravitational force in the spatial coordinate system (extending in the negative Y-axis direction; hereinafter, the vector 302 will be referred to as the "gravitational vector").

Figure 22E:
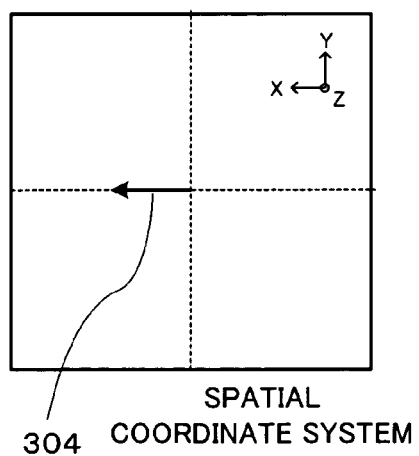
Figure 22E:
Figure 22E:
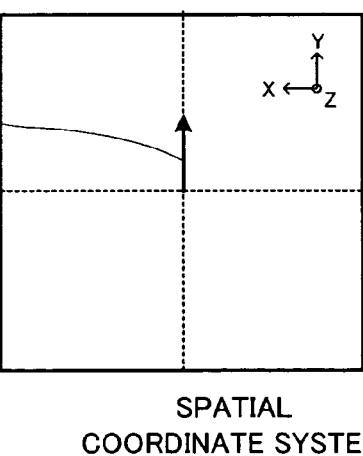

Next, the vector in the local coordinate system detected from the controller 7 is processed with the rotation matrix. For example, the controller 7 is assumed to be swung upward from the inclined state shown in FIG. 22B to the state shown in FIG. 22D. In this case, a vector 304 extending in the positive X-axis direction in the local coordinate system is detected (from the viewpoint of the controller 7, the controller 7 is swung leftward). As shown in FIG. 22E, the vector 304 in the positive X-axis direction is applied to the coordinate system of the virtual game space, and is processed with the rotation matrix. Then, the vector 304 is converted into a vector 305 extending in the positive Y-axis direction in the coordinate system of the virtual game space. Next, the gravitational vector is subtracted from the vector 305, so that a pure vector by the force of the player is obtained. When the pure vector has a value equal to or greater than a predetermined value, it is determined that the pulling operation was performed with sufficient momentum.

Figure 23:
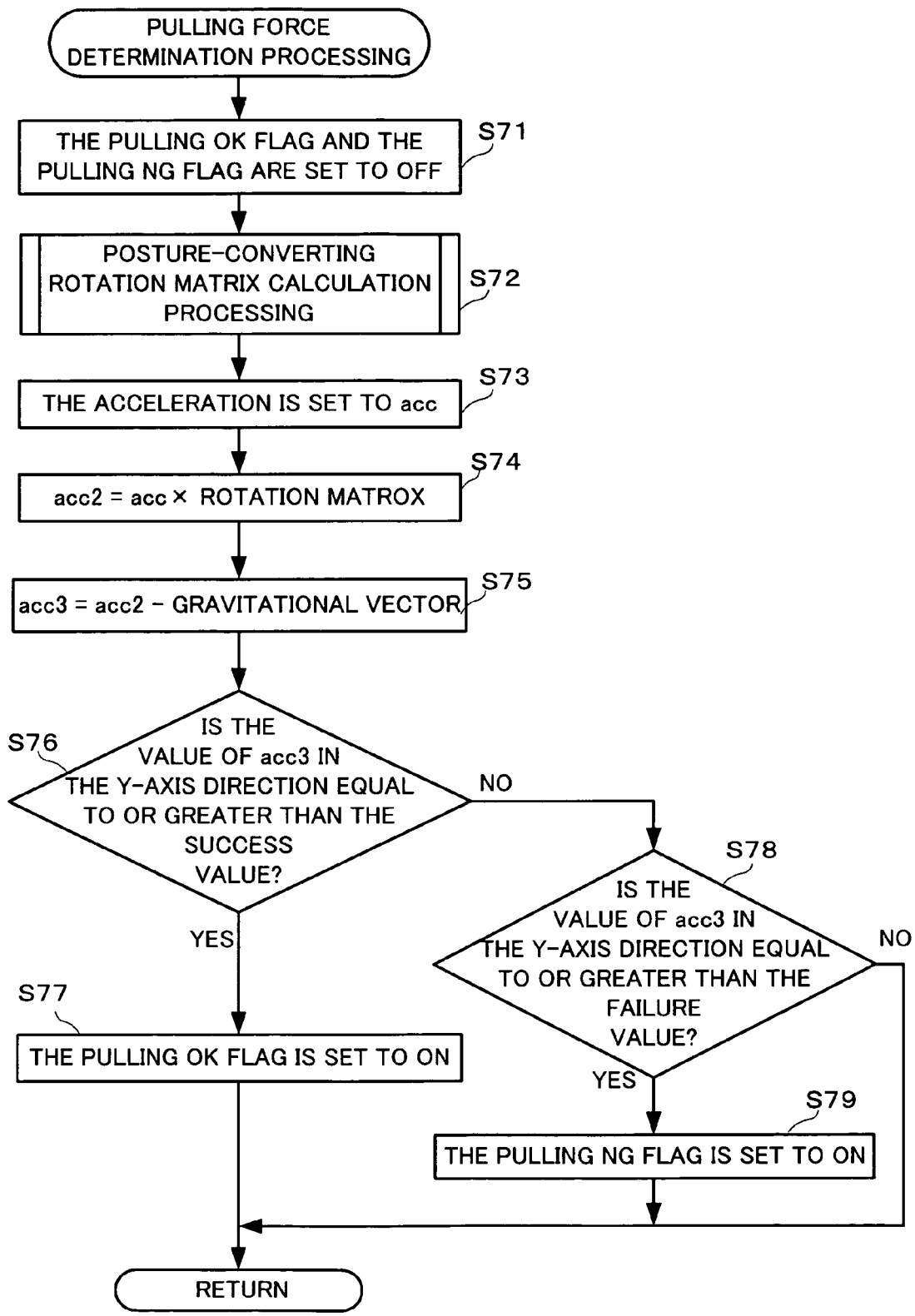
FIG. 23 is a flowchart illustrating the pulling force calculation processing in step 34 shown in FIG. 19 in detail.

FIG. 23 is a flowchart illustrating the pulling force determination processing in step 34 in detail. Referring to FIG. 23, the CPU 30 first sets the pulling OK flag and the pulling NG flag to off (step 71). Next, the CPU 30 executes posture-converting rotation matrix calculation processing for the controller 7 (step 72). By this processing, the rotation matrix 303 in FIG. 22 is obtained. This processing will be described below in detail.

After the rotation matrix 303 is obtained by step 72, the vector of the controller 7 detected in the current frame is set as vector data acc1 (step 73). Then, the CPU 30 multiplies the vector data acc1 by the rotation matrix 303 and stores the multiplication result as the vector data acc2 (step 74). Namely, acc2=the posture-converting rotation matrix×acc1. The CPU 30 subtracts the gravitational vector from the vector data acc2, and stores the subtraction result as the vector data acc3 (step 75).

The CPU 30 determines whether or not the value of the vector data acc3 in the Y-axis direction is equal to or greater than a predetermined success value (step 76). When the value of the vector data acc3 in the Y-axis direction is equal to or greater than the success value, this means that the pulling operation was performed with sufficient momentum. When it is determined in step 76 that the value of the vector data acc3 in the Y-axis direction is equal to or greater than the success value (YES in step 76), the CPU 30 sets the pulling OK flag to on (step 77).

By contrast, when it is determined that the value of the vector data acc3 in the Y-axis direction is less than the success value (NO in step 76), the CPU 30 determines whether or not the value of the vector data acc3 in the Y-axis direction is equal to or greater than a predetermined failure value (step 78). The failure value is set to be lower than the success value. When the value of the vector data acc3 in the Y-axis direction is less than the success value but equal to or greater than the failure value, this means that the pulling operation itself was performed although the momentum was insufficient. When it is determined in step 78 that the value of the vector data acc3 in the Y-axis direction is equal to or greater than the failure value (YES in step 78), the CPU 30 sets the pulling NG flag to on (step 79). By contrast, when it is determined that the value of the vector data acc3 in the Y-axis direction is less than the failure value (NO in step 78), the CPU 30 terminates the pulling force determination processing. The pulling force determination processing is executed in this manner. By this processing, the level of momentum with which the pulling operation was performed can be detected.

The posture-converting rotation matrix calculation processing in step 72 will be described in detail. This processing is generally executed as follows. First, the vector (acceleration) in each frame in 64 frames counted backward from the current frame is checked. The vectors are stored in the ring buffer as described in the first embodiment. The buffer size is 64 (i.e., corresponding to 64 frames). Next, the number of frames in which the vector has a value close to "1" is counted. The value of "1" is used because of the value of the gravitational vector (there is always a vector of "1" in the negative Y-axis direction). Therefore, when the vector has a value around "1", the controller 7 is considered not to be moved significantly. Namely, on this stage of the processing, the number of frames in which the controller 7 did not move significantly is counted. The frames in which the controller 7 moved significantly are excluded. In other words, it is determined whether or not the controller 7 moved significantly during the previous 64 frames. When the number of frames in which the vector has a value close to "1" is 49 or greater (i.e., when the controller 7 is determined not to have moved significantly; for example, the controller 7 is determined to have inclined at 90 degrees rightward with little momentum), the rotation matrix is calculated as described above. By contrast, when the number of frames is 48 or less (i.e., when the controller 7 is determined to have moved significantly), the rotation matrix used so far is still used.

Figure 24:
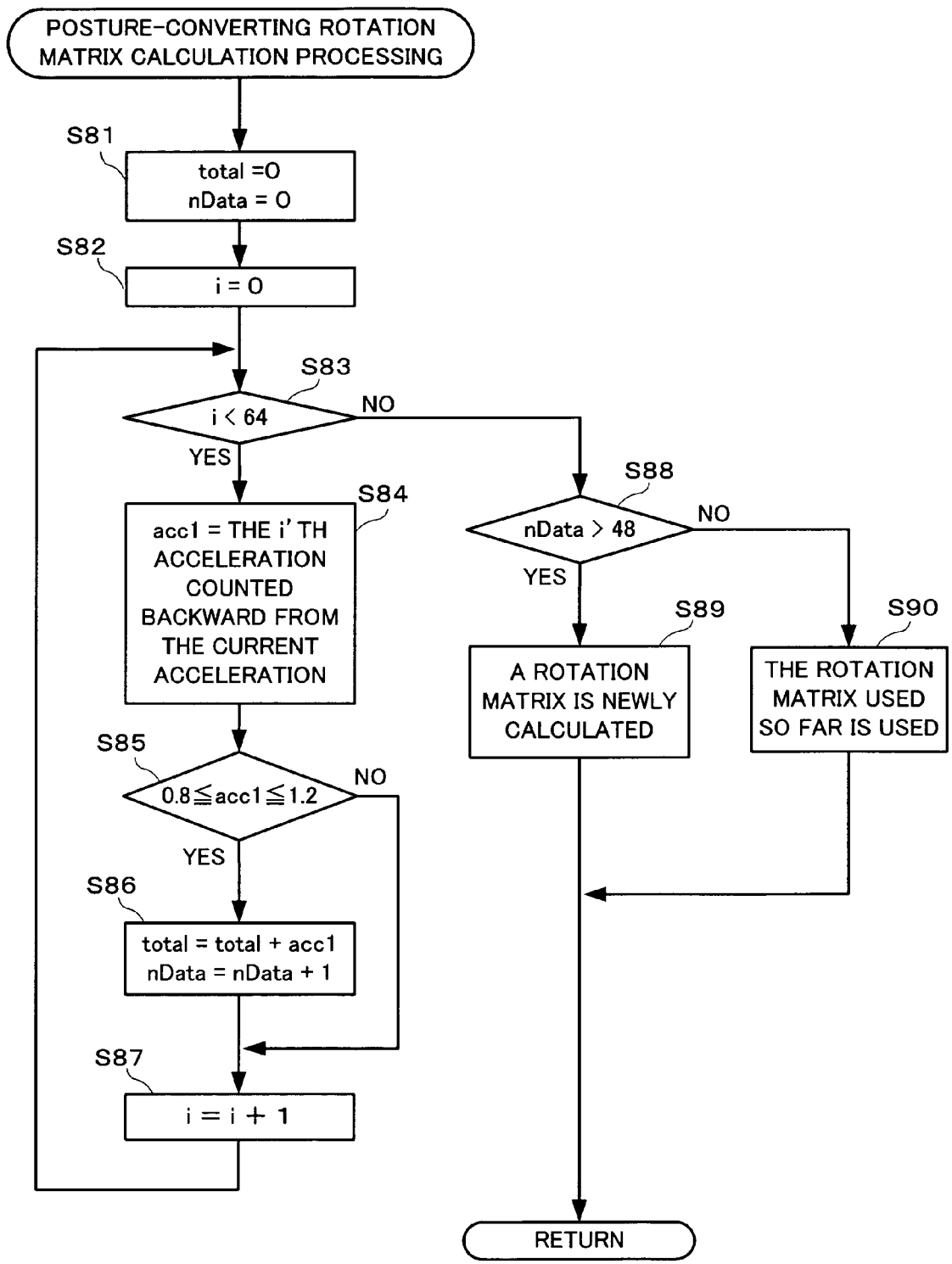
FIG. 24 is a flowchart illustrating rotation matrix calculation processing in step 72 shown in FIG. 23 in detail.

FIG. 24 is a flowchart illustrating the posture-converting rotation matrix calculation processing in step 72 in detail. Referring to FIG. 24, the CPU 30 first sets the comprehensive vector data Total to 0, and also sets the count data nData to 0 (step 81).

Next, the CPU 30 sets variable i to 0 (step 82). Variable i represents the frame to be checked. The CPU 30 determines whether or not the value of variable i is less than 64; i.e., determines whether or not the previous 64 frames were checked (step 83). When it is determined that the value of variable i is less than 64 (YES in step 83), the CPU 30 sets the vector which is the i'th frame counted backward from the latest (current) frame as the vector data acc1 (step 84).

The CPU 30 determines whether or not the value of the vector data acc1 is in the range of 0.8 to 1.2 (step 85). Namely, the CPU 30 determines whether or not the controller 7 moved significantly in the frame which is the i'th frame counted backward from the current frame. When it is determined that the value of the vector data acc1 is within the range of 0.8 to 1.2 (YES in step 85), the CPU 30 adds the value of the vector data acc1 to the value of the comprehensive vector data Total. By this processing, the average of the directions of the accumulated vector data acc1 is obtained. The CPU 30 adds 1 to the value of the count data nData (step 86), and then adds 1 to the value of variable i (step 87). The CPU 30 returns the processing to step 83. By contrast, when the value of the vector data acc1 is not in the range of 0.8 to 1.2 (NO in step 85), the CPU 30 skips step 86 and advances the processing to step 87.

When it is determined in step 83 that the value of variable i is equal to or greater than 64 (NO in step 83), the CPU 30 determines whether or not the value of the count data nData is greater than 48 (step 88). When it is determined that the value of the count data nData is greater than 48 (YES in step 88), the CPU 30 newly obtains a posture-converting rotation matrix (step 89). Among the rotation matrices fulfilling the expression "rotation matrix×Total=gravitational vector", the one having the smallest rotation angle is adopted as the posture-converting rotation matrix.

When it is determined in step 88 that the value of the count data nData is equal to or less than 48 (NO in step 88), the CPU 30 does not newly obtain a rotation matrix and adopts the rotation matrix used so far as the posture-converting rotation matrix (step 90). The posture-converting rotation matrix calculation processing is executed in this manner. As described above, it is determined about how many vectors in the past several tens of frames had substantially the same value as that of the gravitational vector, and a new rotation matrix is obtained depending on the result. In this way, the rotation matrix can be obtained in accordance with the magnitude of the motion of the controller 7. Regardless of the posture of the controller 7, the player's operation of swinging the controller 7 (swinging direction) can be considered based on the spatial coordinate system. This is especially advantageous for the following reasons. When an operation of causing only the direction of the detected acceleration vector to be changed while maintaining the value thereof at substantially the same level as that of the gravitational vector is performed, i.e., an operation of twisting and rotating the controller 7 while keeping the controller 7 in a generally still state is performed, the direction of the acceleration vector having a value close to that of the gravitational vector is changed. Such a change is accurately recognized and the acceleration is corrected to extend in a correct direction (the negative Y-axis direction in the spatial coordinate system, which corresponds to the direction of the gravitational vector). Therefore, in whichever direction the controller 7 may be directed, the swinging direction of the controller 7 can be accurately detected. In addition, according to the above-described processing, the average of the directions of a plurality of accelerations having a value close to that of the gravitational acceleration, which are detected during a past predetermined time duration from the current time, is obtained and the average direction is corrected to the direction of the gravitational vector. Therefore, the swinging direction can be detected more precisely.

As described above, in the second embodiment, the pulling target is specified (the selected pulling target is established) by the controller 7, and the pulling target is controlled to be pulled out or not pulled out in accordance with the acceleration of the pulling operation. Such processing provides a game which can be played intuitively and easily as in the first embodiment. Owing to the use of the posture-converting rotation matrix, the player's operation of swinging the controller 7 can be recognized based on the spatial coordinate system regardless of the posture of the controller 7. As a result, the player can operate the controller 7 in a natural manner.

In the second embodiment, when the cursor 202 approaches the pulling target 202, the pulling target is automatically grasped and the state is transferred to "grasping". Alternatively, the pulling target may be grasped when a button on the controller 7 (for example, the A button) is pressed. For example, the position of the cursor 202 at the time when the A button is pressed is calculated. When there is a pulling target within a predetermined range from the position of the cursor 202, the pulling target is grasped and the state is transferred to "grasping". Namely, when the A button is pressed, the indicated position is established (if there is a pulling target in the vicinity of the indicated position).

Still alternatively, the pulling target may be grasped when a predetermined pattern of acceleration is obtained from the acceleration data. For example, the state may be transferred to "grasping" when a circle surrounding the pulling target is drawn in the vicinity of the pulling target. In this case, it may be determined based on the acceleration data whether or not the pattern of acceleration of the controller 7 is a pattern drawing a circle (e.g., a pattern in which the direction of acceleration is changed from the positive X-axis direction to the positive Y-axis direction, to the negative X-axis direction, and to the negative Y-axis direction).

The indicated position may be established when substantially the same pattern of acceleration is repeated a predetermined number of times. This is applicable to a game of cutting a log with a saw. When an operation of moving the controller 7 back and forth repeatedly is performed, i.e., a pattern of an acceleration in the positive Z-axis direction and an acceleration in the negative Z-axis direction repeated alternately is detected, the position of the cursor at that point may be established as a position at which the log is to be cut. By such processing, the player's operation as if he/she was cutting with a saw in the real world can be reflected on the game. This makes the game more realistic, so that the player can feel as if he/she was present in the virtual game space.

In the above embodiments, the markers 8L and 8R are provided in the vicinity of the screen of the monitor 2, and the controller 7 includes an imaging device for taking an image of infrared light which is output from the markers 8L and 8R. Thus, the position of the controller 7 is detected. Alternatively, the controller 7 may include a marker, and an imaging device may be provided in the vicinity of the screen of the monitor 2. The imaging device may be replaced with a light receiving sensor or the like.

While the example embodiment presented herein has been described in detail, the foregoing description is in all aspects illustrative and not restrictive. It is understood that numerous other modifications and variations can be devised without departing from the scope of the example embodiment.

What is claimed is:

1. A non-transitory storage medium having stored thereon a program executable by a computer of an apparatus for executing processing based on a state of an input device, which is at least one of a position, a moving speed and an acceleration of the input device, the program causing the computer to execute:

sequentially obtaining data variable in accordance with the state of the input device and usable for the processing;

determining whether or not a predetermined condition for the processing has been fulfilled based on the data, wherein said predetermined condition relates to whether the acceleration of the input device exceeds a predetermined value;

indicated position establishment for obtaining information on an indicated position on an image in virtual space, which is calculated from the data at the time when the predetermined condition has been fulfilled;

parameter establishment for obtaining one of the moving speed and the acceleration of the input device which are calculated from the data; and when one of the moving speed and the acceleration which is obtained in the parameter establishment is equal to or greater than a predetermined value, processing for controlling motion of an object which appears in a virtual space based on the indicated position.

2. The non-transitory storage medium according to claim 1, wherein:

the input device includes imaging elements for taking an image of a predetermined imaging target;

the program causes the computer to further execute calculating a coordinate set of a position of the imaging target in an image taken by the imaging elements; and the data obtaining obtains, as the data, data representing the coordinate set, or data corresponding the position of the input device which is calculated from the data representing the coordinate set.

3. The non-transitory storage medium according to claim 1, wherein:

the input device includes an acceleration sensor; and the data obtaining obtains, as the data, data representing an output from the acceleration sensor, or data corresponding to the moving speed of the input device which is calculated from the data representing the output from the acceleration sensor.

4. The non-transitory storage medium according to claim 1, wherein the processing includes:

moving parameter determination for determining a moving start position and a moving direction of the object in the virtual space based on the indicated position and the moving speed; and starting processing for moving the object based on the moving start position and the moving direction.

5. The non-transitory storage medium according to claim 1, wherein:

the processing includes a target object selection for, when the object is present within a predetermined distance from the indicated position obtained in the indicated position establishment, selecting the object as a target of motion control; and the processing controls a motion of only the object selected in the target object selection.

6. The non-transitory storage medium according to claim 5, wherein:

the target object selection includes a stay time determination for determining whether or not a state in which the indicated position and the object are present within the predetermined distance continued for a predetermined time duration or longer; and when the state in which the indicated position and the object are present within the predetermined distance continued for the predetermined time duration or longer, the target object selection selects the object present within the predetermined distance as a motion control target.

7. The non-transitory storage medium according to claim 6, wherein:
the program causes the computer to further execute a moving pattern calculation for, when the stay time determination determines that the state in which the indicated position and the object are present within the predetermined distance continued for the predetermined time duration or longer, calculating, from the data, information on a change in the moving direction or the moving speed of the input device during the time duration; and
when the change in the moving direction or the moving speed shows a predetermined pattern, the target object selection selects the object present within the predetermined distance as a motion control target.

8. The non-transitory storage medium according to claim 1, wherein
the processing causes the object to start performing a first motion when the obtained acceleration is within a first range, and causes the object to start performing a second motion, which is different from the first motion, when the obtained acceleration is within a second range which is different from the first range.

9. An apparatus for executing processing based on a state of an input device, which is at least one of a position, a moving speed and an acceleration of the input device, the apparatus comprising one or more computer processors configured to:
sequentially obtain data variable in accordance with the state of the input device and usable for the processing;
determine whether or not a predetermined condition for the processing has been fulfilled based on the data, wherein said predetermined condition relates to whether the acceleration of the input device exceeds a predetermined value;
obtain information on an indicated position on image in virtual space, which is calculated from the data at the time when the predetermined condition has been fulfilled;
obtain one of the moving speed and the acceleration of the input device which are calculated from the data; and
when one of the obtained moving speed and the acceleration is equal to or greater than a predetermined value, processing for controlling motion of an object which appears in a virtual space based on the indicated position.

10. A non-transitory storage medium having stored thereon a program executable by a computer of an apparatus for executing processing based on a motion of an input device including an acceleration sensor, the program causing the computer to execute:
obtaining data representing an output from the acceleration sensor, or data corresponding to an acceleration of the input device which is calculated from the data representing the output from the acceleration sensor, at an interval of a unit time;
storing the obtained acceleration data;
detecting, from the stored data, a ratio of accelerations having a value close to a value of a gravitational acceleration with respect to accelerations for a predetermined time duration counted backward from the time when the acceleration data was obtained;
when the ratio is equal to or greater than a predetermined value, calculating a conversion parameter for allowing a direction of each of the accelerations, having a value close to the value of the gravitational acceleration in a coordinate system for the input device, to be detected as a direction of the gravitational acceleration; and
executing the processing based on the motion of the input device, which is obtained as a result of the conversion using the conversion parameter.

11. The non-transitory storage medium according to claim 10, wherein:
the program causes the computer to further execute an average direction calculation for obtaining an average of the directions of the accelerations having a value close to the value of the gravitational acceleration; and
the conversion parameter calculation calculates a conversion parameter for allowing the average of the directions obtained in the average direction calculation to be detected as the direction of the gravitational acceleration.

12. An apparatus for executing processing based on a motion of an input device including an acceleration sensor, the apparatus comprising one or more computer processors configured to:
obtain data representing an output from the acceleration sensor, or data corresponding to an acceleration of the input device which is calculated from the data representing the output from the acceleration sensor, at an interval of a unit time;
store the obtained acceleration data in storage locations;
detect, from the data stored by the storage locations, a ratio of accelerations having a value close to a value of a gravitational acceleration with respect to accelerations for a predetermined time duration counted backward from the time when the acceleration data was obtained;
when the ratio is equal to or greater than a predetermined value, calculate a conversion parameter for allowing a direction of each of the accelerations, having a value close to the value of the gravitational acceleration in a coordinate system for the input device, to be detected as a direction of the gravitational acceleration; and
execute the processing based on the motion of the input device, which is obtained as a result of the conversion performed using the conversion parameter.

13. A method for executing processing based on a state of an input device, which is at least one of a position, a moving speed and an acceleration of the input device, the method comprising:
sequentially obtaining data variable in accordance with the state of the input device and usable for the processing;
determining whether or not a predetermined condition for the processing has been fulfilled based on the data, wherein said predetermined condition relates to whether the acceleration of the input device exceeds a predetermined value;
obtaining information on an indicated position on image in virtual space, which is calculated from the data at the time when the predetermined condition has been fulfilled;
obtaining one of the moving speed and the acceleration of the input device which are calculated from the data; and
when one of the obtained moving speed and the acceleration is equal to or greater than a predetermined value, processing for controlling motion of an object which appears in a virtual space based on the indicated position.

14. A system comprising:
a communications device configured to receive a indication from one or more input device, said indication being one or more of a position, a moving speed and an acceleration of the input device; and a computer processor configured to:
- generate a display portion for displaying at least an operating portion of a virtual space;
- sequentially obtain data variable in accordance with the state of the one or more input device and usable for processing;
- determine whether or not a predetermined condition for the processing has been fulfilled based on the data, wherein said predetermined condition relates to whether the acceleration of the one or more input device exceeds a predetermined value;
- establish indicated position for obtaining information on an indicated position on image in virtual space, which is calculated from the data at the time when the predetermined condition has been fulfilled;
- establish a parameter for obtaining one of the moving speed and the acceleration of the one or more input device which are calculated from the data; and
- perform processing for, when one of the moving speed and the acceleration which is obtained by the parameter establishment is equal to or greater than a predetermined value, processing for controlling motion of an object which appears in a virtual space based on the indicated position.

15. A method for executing processing based on a motion of an input device including an acceleration sensor, the method comprising:
- obtaining data representing an output from the acceleration sensor, or data corresponding to an acceleration of the input device which is calculated from the data representing the output from the acceleration sensor, at an interval of a unit time;
- storing in storage locations the acceleration data obtained by the acceleration data obtaining;
- detecting, from the data stored in the storage locations, a ratio of accelerations having a value close to a value of a gravitational acceleration with respect to accelerations for a predetermined time duration counted backward from the time when the acceleration data was obtained;
- when the ratio is equal to or greater than a predetermined value, calculating a conversion parameter for allowing a direction of each of the accelerations, having a value close to the value of the gravitational acceleration in a coordinate system for the input device, to be detected as a direction of the gravitational acceleration; and
- executing the processing based on the motion of the input device, which is obtained as a result of the conversion performed using the conversion parameter.

16. A system comprising
a communications device configured to receive an indication from one or more input device including an acceleration sensor; and
a computer processor configured to:
- generate a display portion for displaying at least an operating portion of a virtual space;
- obtain acceleration data for obtaining data representing an output from the acceleration sensor, or data corresponding to an acceleration of the one or more input device which is calculated from the data representing the output from the acceleration sensor, at an interval of a unit time;
- store the acceleration data obtained by the acceleration data obtaining in storage locations;
- determine a ratio for detecting, from the data stored in the storage locations, a ratio of accelerations having a value close to a value of a gravitational acceleration with respect to accelerations for a predetermined time duration counted backward from the time when the data was obtained by the acceleration data obtaining;
- calculate a conversion parameter for, when the ratio is equal to or greater than a predetermined value, calculating a conversion parameter for allowing a direction of each of the accelerations, having a value close to the value of the gravitational acceleration in a coordinate system for the input device, to be detected as a direction of the gravitational acceleration; and
- perform control for executing the processing based on the motion of the one or more input device, which is obtained as a result of the conversion performed using the conversion parameter.

* * * * *